United States Patent
Kotera et al.

(10) Patent No.: US 12,473,494 B2
(45) Date of Patent: Nov. 18, 2025

(54) LIQUID-CRYSTAL COMPOSITION

(71) Applicant: KAO CORPORATION, Tokyo (JP)

(72) Inventors: Takanori Kotera, Wakayama (JP); Noritaka Takahashi, Sumida-ku (JP)

(73) Assignee: KAO CORPORATION, Tokyo (JP)

( * ) Notice: Subject to any disclaimer, the term of this patent is extended or adjusted under 35 U.S.C. 154(b) by 406 days.

(21) Appl. No.: 17/766,667

(22) PCT Filed: Sep. 30, 2020

(86) PCT No.: PCT/JP2020/037209
§ 371 (c)(1),
(2) Date: Apr. 5, 2022

(87) PCT Pub. No.: WO2021/070709
PCT Pub. Date: Apr. 15, 2021

(65) Prior Publication Data
US 2024/0110099 A1  Apr. 4, 2024

(30) Foreign Application Priority Data

Oct. 8, 2019 (JP) .................. 2019-185304

(51) Int. Cl.
*C09K 19/52* (2006.01)
(52) U.S. Cl.
CPC ........ *C09K 19/52* (2013.01); *C09K 2019/528* (2013.01)
(58) Field of Classification Search
CPC ...................................................... A61K 8/06
See application file for complete search history.

(56) References Cited

U.S. PATENT DOCUMENTS

2007/0265190 A1  11/2007  Thuresson et al.
2008/0255247 A1*  10/2008  Sagalowicz .............. A61K 8/06
516/53

(Continued)

FOREIGN PATENT DOCUMENTS

CN  107428611 A  12/2017
CN  109172526 A  1/2019

(Continued)

OTHER PUBLICATIONS

Extended European Search Report dated Dec. 1, 2023 for Application No. 20873555.5.

(Continued)

*Primary Examiner* — Chanceity N Robinson
(74) *Attorney, Agent, or Firm* — Birch, Stewart, Kolasch & Birch, LLP

(57) ABSTRACT

A liquid-crystal composition containing a liquid crystal having an Fd-3m structure, wherein the liquid-crystal composition is formed by blending a surfactant (a), an oil agent (b), and water (c); the surfactant (a) is a surfactant that is capable of forming at least one structural body (x) selected from a hexagonal structural body and a pre-hexagonal structural body when mixed with the water (c); the oil agent (b) is an oil agent that does not convert all of the structural body (x) into a lamellar structural body, when mixed with the structural body (x); and a ratio between the surfactant (a) and the water (c) constituting the liquid-crystal composition is a ratio that forms the structural body (x) when mixing the surfactant (a) and the water (c).

13 Claims, 1 Drawing Sheet

(56) References Cited

U.S. PATENT DOCUMENTS

| | | | |
|---|---|---|---|
| 2008/0311211 A1* | 12/2008 | Leser | A23D 7/011 977/773 |
| 2009/0155193 A1 | 6/2009 | Joabsson et al. | |
| 2012/0016024 A1 | 1/2012 | Ibe et al. | |
| 2014/0294904 A1 | 10/2014 | Glatter et al. | |
| 2017/0319481 A1* | 11/2017 | Kumaraswamy | A61K 9/146 |
| 2018/0086669 A1 | 3/2018 | Tanaka et al. | |
| 2018/0280261 A1* | 10/2018 | Nioh | A61K 8/602 |

FOREIGN PATENT DOCUMENTS

| | | |
|---|---|---|
| CN | 110037982 A | 7/2019 |
| DE | 100 57 770 A1 | 5/2002 |
| EP | 2 710 997 A1 | 3/2014 |
| JP | 2004-10549 A | 1/2004 |
| JP | 2008-526932 A | 7/2008 |
| JP | 2008-526933 A | 7/2008 |
| JP | 2009-516724 A | 4/2009 |
| JP | 2009-523061 A | 6/2009 |
| JP | 2014-532051 A | 12/2014 |
| JP | 2018-70496 A | 5/2018 |
| JP | 2018-168092 A | 11/2018 |
| WO | WO 2012/157628 A1 | 11/2012 |

OTHER PUBLICATIONS

Misono et al., "Ternary phase behavior of phytosterol ethoxylate, water, and imidazolium-based ionic liquid systems—Lyotropic liquid crystal . . . of compositions", Colloids and Surfaces A., Physiochemical and Engineerings Aspects, vol. 472, 2015 (Available online Feb. 7, 2015), pp. 117-123.

Wang et al., "Microstructure and rheological properties of liquid crystallines formed in brij 97/water/IPM system", Journal of colloid and Interface Science, vol. 297, 2006 (Available online Jan. 9, 2006), pp. 813-818.

Abdulkarim et al., "Study of Pseudoternary Phase Diagram Behaviour and the Effect of Several Tweens and Spans on Palm Oil Esters Characteristics", International Journal of Drug Delivery, 2011, vol. 3, pp. 95-100.

Abdulkarim et al., "Topical piroxicam in vitro release and in vivo anti-inflammatory and analgesic effects from palm oil esters-based nanocream", International Journal of Nanomedicine, 2010, vol. 5, pp. 915-924.

Abdullah et al., "In vitro permeation and in vivo anti-inflammatory and analgesic properties of nanoscaled emulsions containing ibuprofen for topical delivery", International Journal of Nanomedicine, 2011, vol. 6, pp . 387-396.

International Search Report for PCT/JP2020/037209 mailed on Dec. 15, 2020.

Mahdi et al., "Effect of surfactant and surfactant blends on pseudoternary phase diagram behavior of newly synthesized palm kernel oil esters", Drug Design, Development and Therapy, 2011, vol. 5, pp. 311-323.

Mahdi et al., "Formulation and in vitro release evaluation of newly synthesized palm kernel oil esters-based nanoemulsion delivery system for 30% ethanolic dried extract derived from local Phyllanthus urinaria for skin antiaging", International Journal of Nanomedicine, 2011, vol. 6, pp. 2499-2512.

Seddon et al., "An Fd3m Lyotropic Cubic Phase in a Binary Glycolipid/Water System", Langmuir, 1996, vol. 12, No. 22, pp. 5250-5253.

Seddon, "An Inverse Face-Centered Cubic Phase Formed by Diacylglycerol-Phosphatidylcholine Mixtures", Biochemistry, 1990, vol. 29, No. 34, pp. 7997-8002.

Spicer et al., "Novel Process for Producing Cubic Liquid Crystalline Nanoparticles (Cubosomes)", Langmuir, 2001, vol. 17, No. 19, pp. 5748-5756.

Watanabe et al., "Highly Concentrated Emulsions Based on the Reverse Micellar Cubic Phase", Journal of Oleo Science, 2002, vol. 51, No. 12, pp. 771-779.

Yaghmur et al., "Oil-loaded monolinolein-based particles with confined inverse discontinuous cubic structure (Fd3m)", Langmuir, 2006, vol. 22, No. 2, pp. 517-521.

* cited by examiner

LIQUID-CRYSTAL COMPOSITION

TECHNICAL FIELD

The present invention relates to a liquid-crystal composition containing a liquid crystal having an Fd-3m structure.

BACKGROUND ART

Various types of emulsions are known as water containing and oil containing compositions, such as O/W emulsions in which oil droplets are dispersed in the aqueous phase, W/O emulsions in which water droplets are dispersed in the oil phase, O/W/O emulsions and W/O/W emulsions, which are referred to as double emulsions combining the above two types, and, as a special case, bicontinuous emulsions in which the aqueous phase and the oil phase are both continuous phases. These emulsions are widely utilized in the fields of cosmetics, foods, inks, agrochemicals, and the like.

Emulsions are obtained by stirring and mixing water and oil, and in many cases, emulsifiers such as surfactants and fine particles are used for the purpose of stabilizing emulsions. However, even in emulsions that have been stabilized by emulsifiers, the thermodynamic stability is not sufficient, and creaming or coalescence may occur over time, causing the oil and water to separate from each other.

As thermodynamically stable water containing and oil containing composition systems, systems in which water is solubilized in oil or oil solubilized in water are also known. However, in these systems, the amount of solute that can be solubilized is practically limited due to extremely low solubility of the solute in the solvent. Systems in which the solute is solubilized in surfactant micelles, called microemulsions, are also known, but the solubilized state may become unstable due to changes in the adsorption behavior of the surfactant.

By the way, liquid crystals constituted by surfactants and water are known. Such liquid crystals are self-assembled molecular aggregates of surfactants and water, and are in a thermodynamically stable state. Such liquid crystals are known to be able to take a variety of forms depending on the type and concentration of surfactant to be used, and for example, a cubic liquid crystal and a hexagonal liquid crystal as liquid crystals in which the surfactant forms the discontinuous phase and the water forms the continuous phase, a lamellar liquid crystal as liquid crystals in which the surfactant and water both form the continuous phase, a reverse cubic liquid crystal and a reverse hexagonal liquid crystal as liquid crystals in which the surfactant forms the continuous phase and the water forms the discontinuous phase, and the like are known.

In compositions containing these liquid crystals constituted by surfactants and water, additional oily components such as oil agents, water-soluble components, and the like may also be stably contained.

Liquid crystals constituted by surfactants and water have water containing and oil containing properties, are thermodynamically stable, and can contain a large amount of water or oil due to their structure, and thus are sometimes used as reservoirs for water or oil. Also, such liquid crystals are generally viscous and can stably maintain the liquid crystal structure. For example, when a liquid-crystal composition containing such liquid crystals is applied onto an object, the liquid-crystal composition can be retained at the same location on the object for a long period of time. Because of this property, water containing and oil containing liquid crystals are sometimes utilized in the release control application.

Liquid crystals constituted by surfactants and water and having the Fd-3m structure as symmetry are reverse cubic liquid crystals in which the surfactant forms the continuous phase and the water forms the discontinuous phase. It is known that such liquid crystals embrace a large amount of water, about 34% by volume, in the form of extremely fine aggregates of water molecules with a diameter of 10 nm or less.

Liquid-crystal compositions containing the above liquid crystals are viscous and are expected to have release control performance. In addition, since the hydrophobic groups in the surfactant form the continuous phase in such liquid crystals, it is also possible to stably embrace an oily component in the continuous phase.

As reported examples of liquid crystals having the Fd-3m structure (hereinafter, such liquid crystals are also referred to as "Fd-3m liquid crystals"), Non Patent Literature 1 discloses a liquid crystal formed of a combination of 1,2-dioleylphosphatidylcholine, 1,3-dioleoylglycerol, and water, Non Patent Literature 2 discloses a liquid crystal formed of a combination of 1,2-di-O-alkyl-3-O-(D-xylopyranosyl)-sn-glycerols, Di-alkyl glucosyl lipid, and water, Non Patent Literature 3 discloses a liquid crystal formed of a combination of poly(oxyethylene)-poly(dimethylsiloxane) copolymer, $Me_3SiO(Si(Me)_2O)x-(SiMe(C_3H_6(OCH_2)_nOH)O)ySiMe_3$, and water, and Non Patent Literature 4 discloses a liquid crystal formed of a combination of monoolein, ethanol, Poloxamer 407 (PEO98PPO67PEO98), and water. However, in all of the literatures, the types of compounds used in the formation of liquid crystals and their blending ratios are limited, and the degree of freedom in blending is extremely low. Therefore, conventional liquid-crystal compositions may not be utilized in applications where biocompatibility is required. In addition, when Fd-3m liquid crystals are made to embrace oil soluble components or water-soluble components, the Fd-3m structure is often destroyed.

Non Patent Literatures 5 and 6 describe a triangular phase diagram formed of a surfactant (for example, Tween 80) that can produce hexagonal liquid crystals together with water, palm kernel oil, and water, and there are descriptions of Transparent gel, Viscous area, Non-Transparent W/O Liquid emulsion, or O/W LC, O/W emulsions, W/O EMG, and W/O emulsions as the products, but there is no description or suggestion of liquid crystals having the Fd-3m structure. Non Patent Literatures 7 to 9, by the same authors as Non Patent Literatures 5 and 6, evaluates the drug delivery performance of the above products, but only describes the delivery performance of non-water-soluble substances and does not mention the delivery performance of water-soluble substances.

CITATION LIST

Non Patent Literature

NPL1: John M. Seddon, "An Inverse Face-Centered Cubic Phase Formed by Diacylglycerol-Phosphatidylcholine Mixtures1", Biochemistry, Vol. 29, No. 34 (1990), p7997-8002

NPL2: John M. Seddon et al., "An Fd3m Lyotropic Cubic Phase in a Binary Glycolipid/Water System", Langmuir, Vol. 12, No. 22 (1996), p5250-5253

NPL3: K. Watanabe et al., "Highly Concentrated Emulsions Based on the Reverse Micellar Cubic Phase", JOURNAL OF OLEO SCIENCE, Vol. 51, No. 12 (2002), p771-779

NPL4: Patrick T. Spicer et al., "Novel Process for Producing Cubic Liquid Crystalline Nanoparticles (Cubosomes)", Langmuir, Vol. 17, No. 19 (2001), p5748-5756

NPL5: Muthanna F. Abdulkarim et al., "Study of Pseudoternary Phase Diagram Behaviour and the Effect of Several Tweens and Spans on Palm Oil Esters Characteristics", International Journal of Drug Delivery 3 (2011), p95-100

NPL6: Elrashid S. Mahdil et al., "Effect of surfactant and surfactant blends on pseudoternary phase diagram behavior of newly synthesized palm kernel oil esters", Drug Design, Development and Therapy, 5 (2011), p311-323

NPL7: Muthanna F. Abdulkarim et al., "Topical piroxicam in vitro release and in vivo anti-inflammatory and analgesic effects from palm oil esters-based nanocream", International Journal of Nanomedicine, 5 (2010), p915-924

NPL8: Ghassan Z. Abdullah et al., "In vitro permeation and in vivo anti-inflammatory and analgesic properties of nanoscaled emulsions containing ibuprofen for topical delivery", International Journal of Nanomedicine, 6 (2011), p387-396

NPL9: Elrashid S. Mahdi et al., "Formulation and in vitro release evaluation of newly synthesized palm kernel oil esters-based nanoemulsion delivery system for 30% ethanolic dried extract derived from local Phyllanthus urinaria for skin antiaging", International Journal of Nanomedicine, 6 (2011), p2499-2512

SUMMARY OF INVENTION

The present invention relates to the following [1] to [3].

[1] A liquid-crystal composition containing a liquid crystal having an Fd-3m structure, wherein the liquid-crystal composition is formed by blending a surfactant (a), an oil agent (b), and water (c); the surfactant (a) is a surfactant that is capable of forming at least one structural body (x) selected from a hexagonal structural body and a pre-hexagonal structural body when mixed with the water (c); the oil agent (b) is an oil agent that does not convert all of the structural body (x) into a lamellar structural body, when mixed with the structural body (x); and a ratio between the surfactant (a) and the water (c) constituting the liquid-crystal composition is a ratio that forms the structural body (x) when mixing the surfactant (a) and the water (c).

[2] A method for producing the liquid-crystal composition according to the above [1], containing blending the surfactant (a), the oil agent (b), and the water (c) constituting the liquid-crystal composition so as to satisfy the following conditions 1 to 3:

condition 1: the ratio between the surfactant (a) and the water (c) constituting the liquid-crystal composition is a ratio that forms at least one structural body (x) selected from a hexagonal structural body and a pre-hexagonal structural body when mixing the surfactant (a) and the water (c);

condition 2: the oil agent (b) constituting the liquid-crystal composition is blended in an amount of 5% by mass or more relative to a total amount of the surfactant (a), the oil agent (b), and the water (c); and condition 3: a temperature at which the components constituting the liquid-crystal composition are mixed is a temperature equal to or higher than a melting point of the oil agent (b).

[3] A method for selecting the surfactant (a) and the oil agent (b) constituting the liquid-crystal composition according to the above [1], containing the following step 1 to step 3 in order:

step 1: a step of selecting the surfactant (a) that is capable of forming at least one structural body (x) selected from a hexagonal structural body and a pre-hexagonal structural body when mixed with the water (c);

step 2: a step of mixing the surfactant (a) and the water (c) at the ratio that forms the structural body (x) to prepare a mixture containing the structural body (x); and step 3: a step of mixing the mixture obtained in step 2 with an oil agent having the same mass as the surfactant (a) in the mixture to prepare a composition (L), and analyzing a structure of a structural body contained in the composition (L) by small angle X-ray scattering.

DESCRIPTION OF EMBODIMENTS

[Liquid-Crystal Composition]

Figure 1:
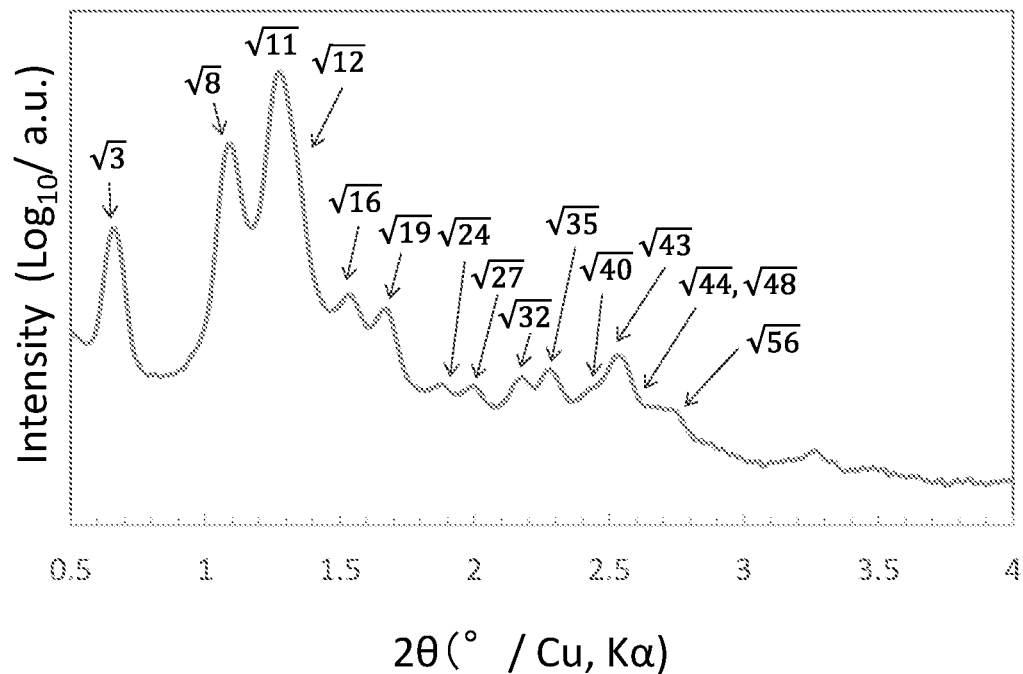
FIG. 1 shows a scattering pattern obtained by analyzing the composition of Example 95 by small angle X-ray scattering (SAXS).

A liquid-crystal composition of the present invention is a liquid-crystal composition containing a liquid crystal having an Fd-3m structure (Fd-3m liquid crystal), wherein the liquid-crystal composition is formed by blending a surfactant (a), an oil agent (b), and water (c); the surfactant (a) is a surfactant that is capable of forming at least one structural body (x) selected from a hexagonal structural body and a pre-hexagonal structural body when mixed with the water (c); the oil agent (b) is an oil agent that does not convert all of the structural body (x) into a lamellar structural body, when mixed with the structural body (x); and the ratio between the surfactant (a) and the water (c) constituting the liquid-crystal composition is a ratio that forms the structural body (x) when mixing the surfactant (a) and the water (c).

By making the liquid-crystal composition of the present invention have the above configuration, it provides the effect of being able to prepare liquid-crystal compositions containing the Fd-3m liquid crystal in a wide range of compositional features and by a simple method, without being limited to systems using special blends.

In the present specification, whether or not a composition formed by blending the surfactant (a), the oil agent (b), and the water (c) contains the Fd-3m liquid crystal can be identified by small angle X-ray scattering (SAXS). In more detail, the SAXS measurement is carried out on that composition, and the angle formed between the repeating surface of the structural body contained in the composition and the X-ray is defined as θ (°) and the scattering pattern is obtained with the horizontal axis as 2θ and the vertical axis as intensity. In that scattering pattern, if the peak resolution is unclear, peak splitting is carried out using a Gaussian function, and when the peak positions satisfy √3:√8:√11: √12:√16, it can be identified that the composition contains the Fd-3m liquid crystal. The SAXS measurement can be carried out by the method described in Examples, specifically.

An object of the present invention is to prepare a liquid-crystal composition containing a liquid crystal having the Fd-3m structure, which has conventionally been constituted by special blends, in a wide range of compositional features and by a simple method.

The present inventors have found that the above object can be achieved by combining a surfactant and an oil agent that satisfy certain requirements, and water, leading to the completion of the present invention.

According to the present invention, a liquid-crystal composition containing a liquid crystal having the Fd-3m structure can be prepared in a wide range of compositional features and by a simple method, without being limited to systems using special blends, thus dramatically increasing the degree of freedom of blending in the preparation of such a liquid-crystal composition.

Since the Fd-3m liquid crystal contained in the liquid-crystal composition of the present invention embraces water in a large amount and in the form of fine aggregates of water molecules, the liquid-crystal composition is expected to have delivery performance for transporting a water-soluble component or water dispersible component beyond an oil phase to an aqueous phase, which has not been known conventionally. In addition, since the liquid-crystal composition contains the Fd-3m liquid crystal, which has a liquid crystal structure different from that of conventional lamellar liquid crystal, it provides a different sense of use when applied and spread over a solid surface compared to conventional compositions. For example, when the liquid-crystal composition of the present invention is applied onto the skin, it can provide a feeling of being easily compatible with the skin.

As used herein, the term "pre-hexagonal structural body" refers to a string-like structural body that appears near the boundary between a hexagonal structural body and another structural body (for example, a lamellar structural body). Such a string-like structural body exists as a mixture with a lamellar structural body, a hexagonal structural body, or a cubic structural body.

The above structural bodies (hexagonal structural body, pre-hexagonal structural body, lamellar structural body, and cubic structural body) formed by mixing of the surfactant (a) and the water (c) can be identified by the SAXS measurement, and specifically, can be measured by the method described in Examples.

In the present invention, the SAXS measurement is carried out on a mixture of the surfactant and water, and when the angle formed between the repeating surface of the structural body and the X-ray is defined as θ (°) and the peaks of scattering pattern obtained with the horizontal axis as 2θ and the vertical axis as intensity satisfies the following requirement (I) or (II), it is considered that at least one structural body (x) selected from a hexagonal structural body and a pre-hexagonal structural body is formed.

(I) A case where the peaks of scattering pattern appear at positions of 1:√3:2. It is considered that a hexagonal structural body has been formed when the peak shape is sharp, and a pre-hexagonal structural body when it is broad. Whether the peak shape is sharp or broad can be determined by the full width at half maximum (FWHM) of the peak, and specifically, it can be determined by the method described in Examples.

(II) A case in which the above (I) does not apply, but broad peaks appear at positions that correspond to neither lamellar structural body nor cubic structural body.

Note that it is considered that a lamellar structural body has been formed when the peaks of scattering pattern appear at positions of 1:2:3:n . . . (n is an integer), and a cubic structural body belonging to body centered cubic when they appear at positions of 1:√2:√3:2.

From the viewpoint of being able to readily form the Fd-3m liquid crystal, it is more preferable that the structural body (x) contains a pre-hexagonal structural body.

The liquid-crystal composition of the present invention is formed by blending the surfactant (a), the oil agent (b), and the water (c), and contains the Fd-3m liquid crystal.

In the composition formed by blending the surfactant (a), the oil agent (b), and the water (c), the present inventors have studied the requirements for forming a liquid-crystal composition containing the Fd-3m liquid crystal, and as a result, have found that the following requirements are essential:

(1) the surfactant (a) is capable of forming at least one structural body (x) selected from a hexagonal structural body and a pre-hexagonal structural body when mixed with the water (c);
(2) the oil agent (b) is an oil agent that does not convert all of the structural body (x) into a lamellar structural body, when mixed with the structural body (x); and
(3) the ratio between the surfactant (a) and the water (c) is a ratio that forms the structural body (x) when mixing the surfactant (a) and the water (c).

With respect to the above (1), it is important that the surfactant (a) used in the liquid-crystal composition of the present invention is capable of forming at least one structural body (x) selected from a hexagonal structural body and a pre-hexagonal structural body when mixed with the water (c). The surfactant (a) may be any surfactant as long as there is a mixing ratio that results in formation of the structural body (x) when mixed with water.

The structural body formed by mixing of the surfactant (a) and the water (c) only needs to contain the structural body (x) and may further contain other structural bodies such as a lamellar structural body and a cubic structural body. However, the present inventors have found that, when neither hexagonal structural body nor pre-hexagonal structural body is formed by mixing of the surfactant and water, no Fd-3m liquid crystal is produced even if the oil agent is further mixed.

With respect to the above (2), it is important that the oil agent (b) used in the liquid-crystal composition of the present invention is an oil agent that does not convert all of the structural body (x) into a lamellar structural body, when mixed with the structural body (x).

In more detail, first of all, the present inventors have found that, even under conditions where the above structural body (x) is formed by mixing of the surfactant (a) and the water (c), the Fd-3m liquid crystal is not produced if an oil agent is used such that all of the structural body (x) is converted into a lamellar structural body. The state in which all of the structural body (x) is converted into a lamellar structural body means a state in which only the lamellar structural body is recognized as a clear periodic structure in the peaks of scattering pattern obtained by the SAXS measurement. That is, as long as not all of the structural body (x) is converted into a lamellar structural body, it is acceptable for the oil agent (b) to convert a part of the structural body (x) into a lamellar structural body.

Also, for the oil agent (b), there needs to be a mixing ratio that results in formation of the Fd-3m liquid crystal, when mixed with the surfactant (a) and the water (c) that are at a ratio that is capable of forming the above structural body (x). Whether or not the Fd-3m liquid crystal is formed can also be adjusted by the amount of oil agent (b).

With respect to the above (3), it is important that the ratio between the surfactant (a) and the water (c) blended into the liquid-crystal composition of the present invention is a ratio that forms the structural body (x) when mixing the surfactant (a) and the water (c). This is because, as mentioned in the above (1), when neither hexagonal structural body nor pre-hexagonal structural body is formed by mixing of the surfactant (a) and the water (c), no Fd-3m liquid crystal is produced even if the oil agent is further mixed.

<Surfactant (a)>

There are no particular restrictions on the surfactant (a) used in the liquid-crystal composition of the present invention, as long as it is capable of forming at least one structural body (x) selected from a hexagonal structural body and a pre-hexagonal structural body when mixed with water, and any of the following surfactants can be used: a nonionic surfactant, an anionic surfactant, a cationic surfactant, and an amphoteric surfactant. From the viewpoint of forming the structural body (x) by mixing with the water (c), it is preferable that the surfactant (a) is a nonionic surfactant.

As the nonionic surfactant, from the viewpoint of being able to readily form the structural body (x) by mixing with water, a nonionic surfactant having a hydrocarbon group having 7 or more and 18 or less carbon atoms as a hydrophobic group is preferred, and a nonionic surfactant represented by the following general formula (a1) or general formula (a2) is more preferred.

(Nonionic Surfactant Represented by General Formula (a1))

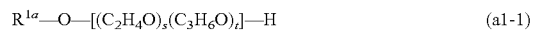
$$R^{1a}\text{-}A[(R^{2a}O)_x\text{—}R^{3a}]_y \quad (a1)$$

wherein $R^{1a}$ is a hydrocarbon group having 7 or more and 18 or less carbon atoms, $R^{2a}$ is an alkylene group having 2 or 3 carbon atoms, and $R^{3a}$ is an alkyl group having 1 or more and 3 or less carbon atoms, or a hydrogen atom; x is an average number of added moles and is a number of 3 or more and 50 or less; and A is —O—, —C(=O)O—, —C(=O)NH—, —C(=O)N=, —NH—, or —N=, and y is 1 when A is —O—, —C(=O)O—, —C(=O)NH—, or —NH— and y is 2 when A is —C(=O)N= or —N=.

In the above general formula (a1), $R^{1a}$ is a hydrocarbon group having 7 or more and 18 or less carbon atoms, and the number of carbon atoms in $R^{1a}$ is preferably 8 or more and more preferably 10 or more, and is preferably 16 or less. Examples of the hydrocarbon group in $R^{1a}$ include a saturated or unsaturated chain aliphatic group such as alkyl group and alkenyl group; a saturated or unsaturated cyclic aliphatic group such as cycloalkyl group and cycloalkenyl group; and an aromatic ring containing group such as aryl group and aralkyl group. From the viewpoint that the structural body (x) can be readily formed when mixed with water, the hydrocarbon group in $R^{1a}$ is preferably a saturated or unsaturated chain aliphatic group, and is more preferably an alkyl group or an alkenyl group. The chain aliphatic group may be linear or branched, and is more preferably linear.

$R^{1a}$ is more preferably an alkyl group or alkenyl group having 8 or more and 18 or less carbon atoms, and is still more preferably an alkyl group or alkenyl group having 10 or more and 16 or less carbon atoms.

$R^{2a}$ is an alkylene group having 2 or 3 carbon atoms, and specific examples thereof include an ethylene group, a propylene group, and a trimethylene group. It is preferably one or more selected from the group consisting of an ethylene group and a propylene group, and is more preferably an ethylene group. Multiple $R^{2a}$ may be the same as or different from each other.

$R^{3a}$ is an alkyl group having 1 or more and 3 or less carbon atoms or a hydrogen atom, and is preferably a hydrogen atom.

x is an average number of added moles, and is a number of 3 or more, preferably 4 or more, and more preferably 5 or more, and of 50 or less, preferably 45 or less, more preferably 40 or less, still more preferably 30 or less, further preferably 20 or less, and even further preferably 15 or less.

A is —O—, —C(=O)O—, —C(=O)NH—, —C(=O)N=, —NH—, or —N=, and y is 1 when A is —O—, —C(=O)O—, —C(=O)NH—, or —NH— and y is 2 when A is —C(=O)N= or —N=. A is preferably —O— or —C(=O)O—, and is more preferably —O—.

x×y represents the average number of added moles of oxyalkylene groups in the nonionic surfactant represented by the general formula (a1).

Specific preferred examples of the nonionic surfactant represented by the above general formula (a1) may include a compound represented by the following formula (a1-1):

$$R^{1a}\text{—O—}[(C_2H_4O)_s(C_3H_6O)_t]\text{—H} \quad (a1\text{-}1)$$

wherein $R^{1a}$ is the same as described above; s is an average number of added moles and is a number of 3 or more and 40 or less; t is an average number of added moles and is a number of 0 or more and 5 or less; and the bonding order of $(C_2H_4O)$ and $(C_3H_6O)$ can be any, and the bonding scheme of $(C_2H_4O)$ and $(C_3H_6O)$ can be either random bonding or block bonding.

In the formula (a1-1), $R^{1a}$ is preferably an alkyl group or alkenyl group having 8 or more and 18 or less carbon atoms, more preferably an alkyl group or alkenyl group having 10 or more and 16 or less carbon atoms, and still more preferably a linear alkyl group or linear alkenyl group having 10 or more and 16 or less carbon atoms. s is a number of preferably 4 or more and more preferably 5 or more, and of preferably 30 or less, more preferably 20 or less, and still more preferably 15 or less. t is preferably a number of 0 or more and 3 or less, and is more preferably 0.

That is, a more preferred compound represented by the formula (a1-1) is a polyoxyalkylene alkyl ether or polyoxyalkylene alkenyl ether in which the alkyl group or alkenyl group has 8 or more and 18 or less, preferably 10 or more and 16 or less carbon atoms, the average number of added moles of oxyethylene groups is 3 moles or more and 40 moles or less, preferably 3 moles or more and 30 moles or less, more preferably 4 moles or more and 20 moles or less, still more preferably 4 moles or more and 15 moles or less, and further preferably 5 moles or more and 15 moles or less, and the average number of added moles of oxypropylene groups is 0 moles or more and 5 moles or less, preferably 0 moles or more and 3 moles or less, and more preferably 0 moles. Still more preferred is a polyoxyethylene alkyl ether or polyoxyethylene alkenyl ether in which the alkyl group or alkenyl group is a linear alkyl group or linear alkenyl group having 8 or more and 18 or less, preferably 10 or more and 16 or less carbon atoms, and the average number of added moles of oxyethylene groups is 3 moles or more and 40 moles or less, preferably 3 moles or more and 30 moles or less, more preferably 4 moles or more and 20 moles or less, still more preferably 4 moles or more and 15 moles or less, and further preferably 5 moles or more and 15 moles or less.

Specific examples of the compound represented by the formula (a1-1) include polyoxyethylene 2-ethylhexyl ether, polyoxyethylene decyl ether, polyoxyethylene dodecyl ether, polyoxyethylene tridecyl ether, polyoxyethylene tetradecyl ether, polyoxyethylene hexadecyl ether, and polyoxyethylene octadecyl ether in which the average number of added moles of oxyethylene groups is 3 moles or more and 40 moles or less, preferably 3 moles or more and 30 moles or less, more preferably 4 moles or more and 20 moles or less, still more preferably 4 moles or more and 15 moles or less, and further preferably 5 moles or more and 15 moles or less. It is preferably one or more selected from the group consisting of polyoxyethylene lauryl ether, polyoxyethylene myristyl ether, polyoxyethylene palmityl ether, and polyoxyethylene stearyl ether in which the average number of added moles of oxyethylene groups is in the above range.

As the compound represented by the formula (a1-1), two or more compounds whose average number of added moles of oxyethylene groups are different from each other can be used as well. In this case, the average number of added moles of oxyethylene groups in the compound represented by formula (a1-1) can be determined by calculating the weighted average in accordance with the mixing ratio of each compound to obtain the average number of added moles of oxyalkylene groups in the entire compounds.

(Nonionic Surfactant Represented by General Formula (a2))

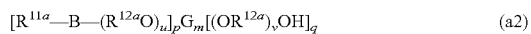
$$[R^{11a}—B—(R^{12a}O)_u]_p G_m[(OR^{12a})_v OH]_q \quad (a2)$$

wherein $R^{11a}$ represents a hydrocarbon group having 7 or more and 18 or less carbon atoms, and $R^{12a}$ each independently represents an alkylene group having 2 or more and 4 or less carbon atoms; u and v are average numbers of added moles and are each independently a number of 0 or more and 40 or less, and u×p+v×q is 0 or more and 40 or less; G represents a polyhydric alcohol residue having 3 or more and 10 or less carbon atoms and having 3 or more and 10 or less hydroxy groups; m is an average condensation degree of G and is a number of 1 or more and 10 or less; p is 1 or more and is a number equal to or less than the number of hydroxy groups of $G_m$, and q is a number of the number of hydroxy groups of $G_m$-p; and B is —O— or —C(=O)O—.

In the above general formula (a2), $R^{11a}$ is a hydrocarbon group having 7 or more and 18 or less carbon atoms, and the number of carbon atoms in $R^{11a}$ is preferably 8 or more and more preferably 10 or more, and is preferably 17 or less. Examples of the hydrocarbon group in $R^{11a}$ include a saturated or unsaturated chain aliphatic group such as alkyl group and alkenyl group; a saturated or unsaturated cyclic aliphatic group such as cycloalkyl group and cycloalkenyl group; and an aromatic ring containing group such as aryl group and aralkyl group. From the viewpoint that the structural body (x) can be readily formed when mixed with water, the hydrocarbon group in $R^{11a}$ is preferably a saturated or unsaturated chain aliphatic group. The chain aliphatic group may be linear or branched, and is more preferably linear.

$R^{11a}$ is more preferably an alkyl group or alkenyl group having 8 or more and 18 or less carbon atoms, still more preferably an alkyl group or alkenyl group having 10 or more and 17 or less carbon atoms, and further preferably a linear alkyl group or linear alkenyl group having 10 or more and 17 or less carbon atoms.

$R^{12a}$ is an alkylene group having 2 or more and 4 or less carbon atoms, and specific examples thereof include an ethylene group, a propylene group, a trimethylene group, a butylene group, and a tetramethylene group. Among the above, $R^{12a}$ is preferably an alkylene group having 2 or more and 3 or less carbon atoms, more preferably one or more selected from the group consisting of an ethylene group and a propylene group, and still more preferably an ethylene group. Multiple $R^{12a}$ may be the same as or different from each other.

u and v are average numbers of added moles and are each independently a number of 0 or more and 40 or less, and u×p+v×q is 0 or more and 40 or less. u×p+v×q represents the average number of added moles of oxyalkylene groups in the nonionic surfactant represented by the general formula (a2).

G represents a polyhydric alcohol residue having 3 or more and 10 or less, preferably 8 or less, and more preferably 6 or less carbon atoms, and having 3 or more and 10 or less, preferably 8 or less, and more preferably 6 or less hydroxy groups, and the polyhydric alcohol residue is preferably one or more selected from the group consisting of a glycerin residue, a sugar residue, and a sugar alcohol residue. Examples of the sugar residue include a residue derived from a monosaccharide such as ribose, glucose, fructose, and galactose. Examples of the sugar alcohol residue include a residue derived from a sugar alcohol such as sorbitol, sorbitan, erythritol, pentaerythritol, and xylitol. G is more preferably one or more selected from the group consisting of a glycerin residue, a glucose residue, a fructose residue, a sorbitan residue, and a pentaerythritol residue. m is an average condensation degree of G and is a number of 1 or more and 10 or less, preferably 5 or less. When G is a sugar residue and the degree of condensation is 2 or more, $G_m$ may be, for example, a sucrose-derived residue (sucrose residue) in which two or more monosaccharides are condensed.

$G_m$ is more preferably a polyglucoside residue in which G is a glucose residue and m is a number of 1 or more and 10 or less, or a sucrose residue in which glucose and fructose are condensed.

p is 1 or more and is a number equal to or less than the number of hydroxy groups of $G_m$, and q is a number of the number of hydroxy groups of $G_m$-p. B is —O— or —C(=O)O—, and is preferably —C(=O)O—.

Specific preferred examples of the nonionic surfactant represented by the above general formula (a2) may include the following compounds (a2-1) to (a2-5):

(a2-1) a sorbitan mono- or di-fatty acid ester in which the constituent fatty acid is a saturated or unsaturated fatty acid having 8 or more and 18 or less carbon atoms and the average number of added moles of oxyethylene groups is 0 or more and 40 or less;

(a2-2) a pentaerythritol fatty acid ester in which the constituent fatty acid is a saturated or unsaturated fatty acid having 8 or more and 18 or less carbon atoms, the average number of added moles of oxyethylene groups is 0 or more and 40 or less, and the ratio of monoester is 60% by mol or more and 90% by mol or less;

(a2-3) a sucrose fatty acid ester in which the constituent fatty acid is a saturated or unsaturated fatty acid having 8 or more and 18 or less carbon atoms and the ratio of monoester is 60% by mol or more and 90% by mol or less;

(a2-4) a polyoxyethylene glycerin mono- or di-fatty acid ester in which the constituent fatty acid is a saturated or unsaturated fatty acid having 8 or more and 18 or less carbon atoms and the average number of added moles of oxyethylene groups is 1 or more and 40 or less; and (a2-5) a monoalkyl glycoside in which the alkyl group has 8 or more and 18 or less, preferably 10 or more and 17 or less carbon atoms, the average number of added moles of oxyethylene groups is 0 or more and 20 or less, and the average condensation degree of sugar is 1 or more and 10 or less.

Specific examples of the compound (a2-1) include a sorbitan fatty acid monoester or diester in which the constituent fatty acid is 2-ethylhexanoic acid, lauric acid, myristic acid, pentadecanoic acid, palmitic acid, palmitoleic acid, margaric acid, stearic acid, oleic acid, or linoleic acid; and a polyoxyethylene sorbitan fatty acid monoester or diester in which the constituent fatty acid is 2-ethylhexanoic acid, lauric acid, myristic acid, pentadecanoic acid, palmitic acid, palmitoleic acid, margaric acid, stearic acid, oleic acid, or linoleic acid and the average number of added moles of oxyethylene groups is 1 or more and 40 or less.

Specific examples of the compound (a2-2) include a pentaerythritol fatty acid ester in which the constituent fatty acid is 2-ethylhexanoic acid, lauric acid, myristic acid, pentadecanoic acid, palmitic acid, palmitoleic acid, margaric acid, stearic acid, oleic acid, or linoleic acid, the average number of added moles of oxyethylene groups is 0 or more and 40 or less, and the ratio of monoester is 60% by mol or more and 90% by mol or less. More specific examples thereof include pentaerythritol 2-ethylhexanoate, pentaerythritol laurate, pentaerythritol myristate, pentaerythritol pentadecanoate, pentaerythritol palmitate, pentaerythritol palmitoleate, pentaerythritol margarate, pentaerythritol stearate, pentaerythritol oleate, and pentaerythritol linoleate in which the average number of added moles of oxyethylene groups is 0 or more and 40 or less and the ratio of monoester is 60% by mol or more and 90% by mol or less.

Specific example of the compound (a2-3) include a sucrose fatty acid ester in which the constituent fatty acid is 2-ethylhexanoic acid, lauric acid, myristic acid, pentadecanoic acid, palmitic acid, palmitoleic acid, margaric acid, stearic acid, oleic acid, or linoleic acid and the ratio of monoester is 60% by mol or more and 90% by mol or less. More specific examples thereof include sucrose 2-ethylhexanoate, sucrose laurate, sucrose myristate, sucrose pentadecanoate, sucrose palmitate, sucrose palmitoleate, sucrose margarate, sucrose stearate, sucrose oleate, and sucrose linoleate in which the ratio of monoester is 60% by mol or more and 90% by mol or less.

Specific examples of the compound (a2-4) include a polyoxyethylene glycerin mono- or di-fatty acid ester in which the constituent fatty acid is 2-ethylhexanoic acid, lauric acid, myristic acid, pentadecanoic acid, palmitic acid, palmitoleic acid, margaric acid, stearic acid, oleic acid, or linoleic acid and the average number of added moles of oxyethylene groups is 1 or more and 40 or less.

In addition, specific examples of the compound (a2-5) include monooctyl (poly)glucoside, monodecyl (poly)glucoside, monolauryl (poly)glucoside, monomyristyl (poly)glucoside, monopentadecyl (poly)glucoside, monopalmityl (poly)glucoside, monopalmitoleyl (poly)glucoside, monostearyl (poly)glucoside, and monooleyl (poly)glucoside in which the average condensation degree of sugar is 1 or more and 10 or less, preferably 1 or more and 5 or less; and polyoxyethylene monooctyl (poly)glucoside, polyoxyethylene monodecyl (poly)glucoside, polyoxyethylene monolauryl (poly)glucoside, polyoxyethylene monomyristyl (poly)glucoside, polyoxyethylene monopentadecyl (poly)glucoside, polyoxyethylene monopalmityl (poly)glucoside, polyoxyethylene monopalmitoleyl (poly)glucoside, polyoxyethylene monostearyl (poly)glucoside, and polyoxyethylene monooleyl (poly)glucoside in which the average number of added moles of oxyethylene groups is 1 or more and 20 or less and the average condensation degree of sugar is 1 or more and 10 or less. Note that "(poly)" in the above compounds represents the structure of a poly-form, in which multiple sugars are condensed, and the structure of a mono-form, in which no sugars are condensed, that is, a monosaccharide, expressed as an average condensation degree of 1.

The above surfactants can be used alone as one kind, or can be used in combination of two or more kinds.

Among the above, as the surfactant (a), preferred is one or more selected from the group consisting of the compound represented by the above formula (al-1) and the compounds (a2-1) to (a2-5), more preferred is one or more selected from the group consisting of the compound represented by the above formula (al-1), the compound (a2-1), and the compound (a2-3), and still more preferred is one or more selected from the group consisting of polyoxyethylene lauryl ether in which the average number of added moles of oxyethylene groups is 3 moles or more and 20 moles or less, polyoxyethylene sorbitan monooleate or dioleate in which the average number of added moles of oxyethylene groups is 1 or more and 40 or less, and sucrose laurate in which the ratio of monoester is 60% by mol or more and 90% by mol or less.

Furthermore, the present inventors have found that the surfactant (a) used for forming the Fd-3m liquid crystal is preferably a mixture, that is, two or more kinds, rather than a single component, and it is more preferably a mixture of two or more components with similar structures. As for the "mixture of two or more components with similar structures", specifically, when the surfactant (a) is a nonionic surfactant having oxyalkylene groups, preferably oxyethylene groups, it is preferable that the surfactant is a mixture of two or more components having numbers of added moles of oxyalkylene groups different from each other, for example. When the nonionic surfactant having oxyalkylene groups is formed of a single component, that is, only of a component with the same number of added moles of oxyalkylene groups, the structural body formed by mixing that component with water tends to be a firm hexagonal structural body, and therefore, even when the oil agent (b) is mixed, the structural change is difficult to occur and it is unlikely to be converted into the Fd-3m liquid crystal. For this reason, when the surfactant is a single component, in order to form the Fd-3m liquid crystal, it is normally necessary to increase the amount of oil agent (b) to be blended. In contrast, when the nonionic surfactant having oxyalkylene groups is a mixture of components having numbers of added moles of oxyalkylene groups different from each other, the structural body to be formed does not become a firm hexagonal structural body compared to the case where a surfactant formed of a single component is used, and it is believed that even mixing with a small amount of oil agent (b) will allow for easy conversion into the Fd-3m liquid crystal. Accordingly, it is preferable for the surfactant to be a mixture of two or more components having numbers of added moles of oxyalkylene groups different from each other in that the degree of freedom in blending is increased.

For example, in the nonionic surfactant represented by the above general formula (a1) or the nonionic surfactant represented by the above general formula (a2) (except for a case where u=v=0), when the nonionic surfactant has an average number of added moles of oxyalkylene groups in the nonionic surfactant of n, the surfactant may contain a component having a number of added moles of oxyalkylene groups of n with a content of substantially 0% by mass from the above viewpoint, that is, with a content of 0% by mass or more, preferably 0.1% by mass or more, more preferably 0.5% by mass or more, and still more preferably 1% by mass or more, and of preferably 80% by mass or less, more preferably 60% by mass or less, still more preferably 50% by mass or less, and further preferably 40% by mass or less. Furthermore, the surfactant contains a component having a number of added moles of oxyalkylene groups of n+1 to n+10 with a content of preferably 0.5% by mass or more, more preferably 1% by mass or more, and still more preferably 2% by mass or more, and of preferably 80% by mass or less, more preferably 70% by mass or less, and still more preferably 60% by mass or less. The content of a component in which n is 0, that is, a compound not having oxyalkylene groups, is better to be small because the properties of the oil agent become stronger, and it is preferably 0% by mass or more and 20% by mass or less, more preferably 18% by mass or less, and still more preferably 15% by mass or less.

The content of each component in the above nonionic surfactant can be measured by high performance liquid chromatography, and specifically by the method described in Examples.

Note that, in a case where two or more surfactants are used in combination as the surfactant (a), the content of the component having a number of added moles of oxyalkylene groups of n, the content of the component having a number of added moles of oxyalkylene groups of n+1 to n+10, and the content of the component having a number of added moles of oxyalkylene groups of 0 in the surfactant (a) can be determined by analyzing the contents of the above components in the respective surfactants and calculating the contents of the above components in the entire surfactant (a) in accordance with the mixing ratio of the components.

Other examples of the "mixture of two or more components with similar structures" in the surfactant (a) include, in the nonionic surfactants represented by the above general formula (a1) and the above general formula (a2), for example, a mixture of two or more components in which the number of carbon atoms, type, and presence or absence of branching of the hydrocarbon group of $R^{1a}$ or $R^{11a}$, as well as the type, bonding mode, and the like of oxyalkylene groups are different from each other.

Whether or not a surfactant is the surfactant (a), which is capable of forming at least one structural body (x) selected from a hexagonal structural body and a pre-hexagonal structural body when mixed with water, can be determined by a method described in the selection method, which will be mentioned later.

<Oil Agent (b)>

In the present invention, an oil agent means a component that can separate from the aqueous phase to form an oil phase, and refers to an oil agent with a solubility of less than 0.1 g in 100 g of water at 25° C., for example.

The oil agent (b) used in the liquid-crystal composition of the present invention is an oil agent that does not convert all of the structural body (x) into a lamellar structural body, when mixed with the structural body (x) formed by mixing of the surfactant (a) and the water (c). As mentioned above, the present inventors have found that the Fd-3m liquid crystal is not produced when an oil agent is used such that all of the structural body (x) is converted into a lamellar structural body. On the other hand, as long as only a part, but not all, of the structural body (x) is converted into a lamellar structural body by mixing with an oil agent, there is a possibility that the Fd-3m liquid crystal is produced.

From the viewpoint of mixing with other components to form the Fd-3m liquid crystal, it is preferable to mix the oil agent (b) with other components in a molten state, that is, at a temperature equal to or higher than the melting point, in the preparation of the liquid-crystal composition. From this viewpoint, the oil agent (b) has a melting point of preferably lower than 100° C., more preferably 80° C. or lower, still more preferably 50° C. or lower, and further preferably 20° C. or lower. When the melting point of the oil agent (b) is in the above range, it is possible to prepare the liquid-crystal composition in a wide temperature range without heating to a temperature exceeding 100° C., for example.

In addition, from the viewpoint of facilitating the preparation of the liquid-crystal composition in a wide temperature range, the molecular weight of the oil agent (b) is preferably 1,500 or less, more preferably 1,200 or less, and still more preferably 1,000 or less. Also, from the viewpoint of suppressing volatilization, it is preferably 100 or more, more preferably 120 or more, still more preferably 150 or more, and further preferably 200 or more.

Furthermore, as the oil agent (b), an oil agent with fewer polar groups is preferred. This is because an oil agent with fewer polar groups can prevent it from acting on the structural body (x) and converting all of it into a lamellar structural body, thus facilitating easy formation of the Fd-3m liquid crystal.

Specifically, the oil agent (b) is preferably an oil agent with a low content ratio of a hydroxy group, a carboxy group, an amino group, and an amide group, and is more preferably an oil agent having no hydroxy group, carboxy group, amino group, or amide group. More specifically, even when the oil agent (b) has a hydroxy group, a carboxy group, an amino group, or an amide group, the functional group equivalent amount of these polar groups is preferably 300 g/equivalent amount or more, more preferably 500 g/equivalent amount or more, still more preferably 750 g/equivalent amount or more, and further preferably 1,000 g/equivalent amount or more.

In addition, it is preferable that, in the oil agent (b), the content of an oil agent having one or more functional groups selected from the group consisting of a hydroxy group, a carboxy group, an amino group, and an amide group is small. The content thereof is preferably smaller than that of an oil agent that contains no hydroxy group, carboxy group, amino group, or amide group, and the content in the entire oil agents is preferably 40% by mass or less, more preferably 20% by mass or less, still more preferably 10% by mass or less, further preferably 5% by mass or less, even further preferably less than 1% by mass, and still further preferably substantially 0% by mass.

Furthermore, the oil agent (b) is preferably an oil agent in which the content of oxyalkylene groups having 2 or more and 4 or less carbon atoms is small, and specifically, the content of oxyalkylene groups having 2 or more and 4 or less carbon atoms in the oil agent is preferably 25% by mass or less, more preferably 15% by mass or less, still more preferably 10% by mass or less, and further preferably substantially 0% by mass.

From the above viewpoint, the oil agent (b) is preferably one or more selected from the group consisting of a hydrocarbon oil and an ester oil, and is more preferably one or more selected from the group consisting of (i) a hydrocarbon oil having 8 or more and 36 or less carbon atoms, (ii) a fatty acid monoester formed of a fatty acid having 8 or more and 22 or less carbon atoms and a monohydric alcohol having 1 or more and 24 or less carbon atoms, (iii) a fatty acid diester formed of a fatty acid having 8 or more and 22 or less carbon atoms and a dihydric alcohol having 1 or more and 12 or less carbon atoms, (iv) a dicarboxylic acid diester formed of a dicarboxylic acid having 4 or more and 18 or less carbon atoms and a monohydric alcohol having 1 or more and 24 or less carbon atoms, (v) a tricarboxylic acid triester formed of a tricarboxylic acid having 5 or more and 12 or less carbon atoms and a monohydric alcohol having 1 or more and 24 or less carbon atoms, and (vi) a glycerin fatty acid triester.

Examples of (i) the hydrocarbon oil having 8 or more and 36 or less carbon atoms include a linear or branched, saturated or unsaturated hydrocarbon oil having 8 or more and 36 or less carbon atoms such as octane, 2-ethylhexane, nonane, decane, undecane, dodecane, isododecane, tridecane, tetradecane, hexadecane, octadecane, eicosane, docosane, squalane and squalene.

Examples of (ii) the fatty acid monoester formed of a fatty acid having 8 or more and 22 or less carbon atoms and a monohydric alcohol having 1 or more and 24 or less carbon atoms include a monoester of a saturated or unsaturated fatty acid having 8 or more and 22 or less carbon atoms such as 2-ethylhexanoic acid, lauric acid, myristic acid, pentadecanoic acid, palmitic acid, palmitoleic acid, margaric acid, stearic acid, oleic acid, linoleic acid, erucic acid, arachidic acid, and behenic acid with an aliphatic or aromatic ring containing monohydric alcohol having 1 or more and 24 or less carbon atoms such as methanol, ethanol, n-propyl alcohol, isopropyl alcohol, n-butyl alcohol, isobutyl alcohol, n-pentyl alcohol, isopentyl alcohol, neopentyl alcohol, hexanol, heptanol, octanol, 2-ethylhexyl alcohol, nonanol, isononyl alcohol, decanol, isodecyl alcohol, dodecanol, lauryl alcohol, tridecanol, myristyl alcohol, pentadecanol, cetyl alcohol, stearyl alcohol, isostearyl alcohol, oleyl alcohol, behenyl alcohol, 2-octyldodecanol, phenol, and benzyl alcohol, and examples thereof include cetyl 2-ethylhexanoate, isopropyl myristate, hexadecyl myristate, 2-octyldodecyl myristate, isopropyl palmitate, hexadecyl palmitate, and 2-ethylhexyl stearate.

Examples of (iii) the fatty acid diester formed of a fatty acid having 8 or more and 22 or less carbon atoms and a dihydric alcohol having 1 or more and 12 or less carbon atoms include a diester of a saturated or unsaturated fatty acid having 8 or more and 22 or less carbon atoms such as 2-ethylhexanoic acid, lauric acid, myristic acid, pentadecanoic acid, palmitic acid, palmitoleic acid, margaric acid, stearic acid, oleic acid, linoleic acid, erucic acid, arachidic acid, and behenic acid with an aliphatic or aromatic dihydric alcohol having 1 or more and 12 or less carbon atoms such as ethylene glycol, propylene glycol, butylene glycol, hexanediol, octanediol, decanediol, dodecanediol, and hydroquinone, and examples thereof include ethylene glycol di(2-ethylhexanoate), ethylene glycol dilaurate, ethylene glycol distearate, and ethylene glycol dioleate.

Examples of (iv) the dicarboxylic acid diester formed of a dicarboxylic acid having 4 or more and 18 or less carbon atoms and a monohydric alcohol having 1 or more and 24 or less carbon atoms include a diester of an aliphatic or aromatic dicarboxylic acid having 4 or more and 18 or less carbon atoms such as succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 3-cyclobutanedicarboxylic acid, cyclopentanedicarboxylic acid, cyclohexanedicarboxylic acid, 2,5-norbornanedicarboxylic acid, fumaric acid, maleic acid, itaconic acid, phthalic acid, and naphthalenedicarboxylic acid with an aliphatic or aromatic ring containing monohydric alcohol having 1 or more and 24 or less carbon atoms such as methanol, ethanol, n-propyl alcohol, isopropyl alcohol, n-butyl alcohol, isobutyl alcohol, n-pentyl alcohol, isopentyl alcohol, neopentyl alcohol, hexanol, heptanol, octanol, 2-ethylhexyl alcohol, nonanol, isononyl alcohol, decanol, isodecyl alcohol, dodecanol, lauryl alcohol, tridecanol, myristyl alcohol, pentadecanol, cetyl alcohol, stearyl alcohol, isostearyl alcohol, oleyl alcohol, behenyl alcohol, 2-octyldodecanol, phenol, and benzyl alcohol, and examples thereof include diisobutyl adipate and diisononyl phthalate.

Examples of (v) the tricarboxylic acid triester formed of a tricarboxylic acid having 5 or more and 12 or less carbon atoms and a monohydric alcohol having 1 or more and 24 or less carbon atoms include a triester of an aliphatic or aromatic tricarboxylic acid having 5 or more and 12 or less carbon atoms such as ethanetricarboxylic acid, propanetricarboxylic acid, trimellitic acid, and trimesic acid with an aliphatic or aromatic ring containing monohydric alcohol having 1 or more and 24 or less carbon atoms such as methanol, ethanol, n-propyl alcohol, isopropyl alcohol, n-butyl alcohol, isobutyl alcohol, n-pentyl alcohol, isopentyl alcohol, neopentyl alcohol, hexanol, heptanol, octanol, 2-ethylhexyl alcohol, nonanol, isononyl alcohol, decanol, isodecyl alcohol, dodecanol, lauryl alcohol, tridecanol, myristyl alcohol, pentadecanol, cetyl alcohol, stearyl alcohol, isostearyl alcohol, oleyl alcohol, behenyl alcohol, 2-octyldodecanol, phenol, and benzyl alcohol, and examples thereof include triisodecyl trimellitate.

In addition, examples of (vi) the glycerin fatty acid triester include a triester of glycerin with a saturated or unsaturated fatty acid having 8 or more and 22 or less carbon atoms, and examples thereof include coconut oil, olive oil, palm kernel oil, triolein, tristearin, and triglyceride 2-ethylhexanoate.

The above oil agents can be used alone as one kind, or can be used in combination of two or more kinds.

Among the above, as the oil agent (b), more preferred is one or more selected from the group consisting of (i) a hydrocarbon oil having 8 or more and 36 or less carbon atoms, (ii) a fatty acid monoester formed of a fatty acid having 8 or more and 22 or less carbon atoms and a monohydric alcohol having 1 or more and 24 or less carbon atoms, (iv) a dicarboxylic acid diester formed of a dicarboxylic acid having 4 or more and 18 or less carbon atoms and a monohydric alcohol having 1 or more and 24 or less carbon atoms, (v) a tricarboxylic acid triester formed of a tricarboxylic acid having 5 or more and 12 or less carbon atoms and a monohydric alcohol having 1 or more and 24 or less carbon atoms, and (vi) a glycerin fatty acid triester, and still more preferred is one or more selected from the group consisting of octane, decane, undecane, dodecane, isododecane, tridecane, tetradecane, hexadecane, octadecane, squalane, squalene, cetyl 2-ethylhexanoate, isopropyl myristate, hexadecyl myristate, 2-octyldodecyl myristate, isopropyl palmitate, hexadecyl palmitate, 2-ethylhexyl stearate, diisobutyl adipate, diisononyl phthalate, triisodecyl trimellitate, triolein, tristearin, and triglyceride 2-ethylhexanoate.

Whether or not an oil agent is the oil agent (b), which does not convert all of the structural body (x) into a lamellar structural body, when mixed with the structural body (x) formed by mixing of the surfactant (a) and the water (c), can be determined by a method described in the selection method, which will be mentioned later.

<Water (c)>

The component (c) used in the liquid-crystal composition of the present invention is preferably deionized water or distilled water from the viewpoint of obtaining a stable liquid-crystal composition, but tap water, ground water, or the like sterilized with hypochlorous acid or the like may be used to the extent that the stability of the liquid-crystal composition of the present invention is not impaired.

The liquid-crystal composition of the present invention is mainly constituted by the above component (a), component (b), and component (c), and contains the Fd-3m liquid crystal as the liquid crystal body. Whether or not a liquid-crystal composition contains the Fd-3m liquid crystal can be identified by the SAXS measurement, and specifically measured by the method described in Examples.

<Contents>

The contents of the above component (a), component (b), and component (c) in the liquid-crystal composition of the present invention can be defined as follows.

First of all, from the viewpoint of stably forming the Fd-3m liquid crystal, the liquid-crystal composition of the present invention contains the surfactant (a) with a content of preferably 1% by mass or more, more preferably 2% by mass or more, still more preferably 3% by mass or more, further preferably 5% by mass or more, and even further preferably 10% by mass or more, and of preferably 70% by mass or less, more preferably 60% by mass or less, still more preferably 50% by mass or less, further preferably 45% by mass or less, and even further preferably 40% by mass or less.

The ratio between the surfactant (a) and the water (c) constituting the liquid-crystal composition of the present invention is a ratio that forms the structural body (x) when mixing the surfactant (a) and the water (c). This ratio varies depending on the type of surfactant used, and whether or not the structural body (x) is formed in a mixture obtained by mixing the surfactant (a) and the water (c) in an arbitrary ratio can be confirmed by the SAXS measurement.

In one embodiment, when the surfactant (a) is the nonionic surfactant represented by the above general formula (a1) or general formula (a2), from the viewpoint of stably forming the structural body (x), the ratio between the surfactant (a) and the water (c) constituting the liquid-crystal composition is preferably 0.05 or more, more preferably 0.1 or more, still more preferably 0.2 or more, and further preferably 0.3 or more, and is preferably 0.95 or less, more preferably 0.9 or less, still more preferably 0.8 or less, and further preferably 0.7 or less, as the mass ratio of the component (a) to the total amount of the component (a) and the component (c), (a)/((a)+(c)).

The content of the oil agent (b) in the liquid-crystal composition of the present invention may be any amount that can form the Fd-3m liquid crystal when the oil agent is mixed with the component (a) and the component (c). From the viewpoint of stably forming the Fd-3m liquid crystal, the liquid-crystal composition contains the oil agent (b) with a content of preferably 0.01 or more, more preferably 0.05 or more, still more preferably 0.1 or more, and further preferably 0.5 or more, and of preferably 500 or less, more preferably 100 or less, still more preferably 10 or less, and further preferably 5 or less, as the mass ratio relative to the surfactant (a), (b)/(a).

In addition, from the viewpoint of stably forming the Fd-3m liquid crystal, the liquid-crystal composition of the present invention contains the oil agent (b) with a content of preferably 5% by mass or more, more preferably 10% by mass or more, still more preferably 20% by mass or more, and further preferably 25% by mass or more, and of preferably 85% by mass or less, more preferably 80% by mass or less, still more preferably 70% by mass or less, and even further preferably 50% by mass or less, and even further preferably 45% by mass or less, relative to the total amount of the surfactant (a), the oil agent (b), and the water (c).

The ranges of contents of the component (a), component (b), and component (c) that satisfy the requirements of the present invention can also be determined by drawing a three phase diagram.

From the viewpoint of stably forming the Fd-3m liquid crystal, the liquid-crystal composition of the present invention contains the component (a), the component (b), and the component (c) with a total content of preferably 5% by mass or more, more preferably 10% by mass or more, still more preferably 30% by mass or more, further preferably 50% by mass or more, even further preferably 70% by mass or more, still further preferably 80% by mass or more, and yet further preferably 90% by mass or more, and of 100% by mass or less.

<Water-Soluble or Water-Dispersible Functional Component (d)>

The liquid-crystal composition of the present invention is characterized by the containment of the Fd-3m liquid crystal, which is formed by mixing the surfactant (a), the oil agent (b), and the water (c). The Fd-3m liquid crystal is a reverse cubic liquid crystal in which water forms the discontinuous phase, and the continuous phase formed by the surfactant (a) embraces about 34% by volume of aggregates of water molecules with a diameter of 10 nm or less.

Therefore, the Fd-3m liquid crystal in the liquid-crystal composition of the present invention has a unique property that it can embrace a water-soluble component or water-dispersible component in the water that forms the discontinuous phase and can transport that component beyond an oil phase to an aqueous phase. From this viewpoint, the liquid-crystal composition of the present invention can further contain a water-soluble or water-dispersible functional component as a component (d), which is the delivery target substance, as long as the Fd-3m liquid crystal structure can be maintained. It is preferable that the component (d) is a water-soluble component from the viewpoint of transporting it beyond an oil phase to an aqueous phase.

Examples of the water-soluble or water-dispersible functional component (d) include a functional component such as a water-soluble coloring matter including dye and the like, a flavor, a disinfectant, a chemical agent, a bleaching agent, an enzyme, and an alkaline agent. These functional components can be selected as appropriate in accordance with the application of the liquid-crystal composition.

<Oil Soluble Functional Component (e)>

Since the liquid-crystal composition of the present invention contain the Fd-3m liquid crystal, it usually exhibits properties as a non-Newtonian fluid. Also, since the liquid crystal structure of Fd-3m liquid crystal is different from that of conventional lamellar liquid crystal, the liquid-crystal composition of the present invention provides a different sense of use when applied and spread over a solid surface compared to conventional liquid-crystal compositions.

In order to utilize these properties for the application, the liquid-crystal composition of the present invention can further contain an oil soluble functional component as a component (e), as long as the Fd-3m liquid crystal structure can be maintained. Examples of the oil soluble functional component (e) include a functional component such as a pigment, a moisturizing agent, a lubricating agent, an oil soluble flavor, and a chemical agent. These functional components can be selected as appropriate in accordance with the application of the liquid-crystal composition.

When the liquid-crystal composition of the present invention contains the component (d) or the component (e), the suitable range of content thereof varies depending on the type of component, but can be, for example, the following range.

When the liquid-crystal composition of the present invention contains the component (d), from the viewpoint of expressing the efficacy of the component (d), the Fd-3m liquid-crystal composition can contain the component (d) with a content of preferably 0.0001% by mass or more, 0.01% by mass or more, 1% by mass or more, or 10% by mass or more. In addition, from the viewpoint of maintaining the Fd-3m liquid crystal structure and stably expressing delivery performance for transporting the component (d) beyond an oil phase to an aqueous phase, the liquid-crystal composition can contain the component (d) with a content of preferably 40% by mass or less, and more preferably 30% by mass or less.

When the liquid-crystal composition of the present invention contains the component (e), from the viewpoint of providing a different sense of use when applying and spreading the Fd-3m liquid-crystal composition over a solid surface compared to conventional compositions and from the viewpoint of expressing the efficacy of the functional component, the liquid-crystal composition can contain the component (e) with a content of preferably 0.0001% by mass or more, 0.01% by mass or more, 1% by mass or more, or 10% by mass or more. In addition, from the viewpoint of stably maintaining the Fd-3m liquid crystal structure, the liquid-crystal composition can contain the component (e) with a content of preferably 40% by mass or less, and more preferably 30% by mass or less.

In the liquid-crystal composition of the present invention, a surfactant other than the component (a), an antioxidant, a preservative, a polymer compound, and the like may be blended as other components, as long as the Fd-3m liquid crystal structure can be maintained.

Although containment of an oil agent other than the component (b) is not excluded in the liquid-crystal composition of the present invention, but from the viewpoint of suppressing the conversion of the structural body (x) into a lamellar structural body and from the viewpoint of maintaining the Fd-3m liquid crystal structure in the liquid-crystal composition, its content is preferably smaller. For example, the content of an oil agent (b') other than the component (b), typically oil agent having one or more functional groups selected from the group consisting of a hydroxy group, a carboxy group, an amino group, and an amide group, is preferably 0.40 or less, more preferably 0.20 or less, still more preferably 0.10 or less, further preferably 0.05 or less, and even further preferably 0, as the mass ratio relative to the total amount of the oil agent (b) and the oil agent (b'), (b')/((b)+(b')).

For the liquid-crystal composition of the present invention, a viscosity and a pH suited for the application are adopted. In addition, for the liquid-crystal composition of the present invention, the temperature of use can be set as appropriate in accordance with the application, and it is sufficient as long as it contains the Fd-3m liquid crystal at least at that temperature of use, but from the viewpoint of handling properties and versatility, it is preferably one in which the Fd-3m liquid crystal is formed at 25° C.

[Method for Producing Liquid-Crystal Composition]

A method for producing the liquid-crystal composition of the present invention is not particularly restricted, but from the viewpoint of efficiently forming the Fd-3m liquid crystal, it is preferable that the surfactant (a), the oil agent (b), and the water (c) constituting the liquid-crystal composition are blended so as to satisfy the following conditions 1 to 3:

condition 1: the ratio between the surfactant (a) and the water (c) constituting the liquid-crystal composition is a ratio that forms at least one structural body (x) selected from a hexagonal structural body and a pre-hexagonal structural body when mixing the surfactant (a) and the water (c);

condition 2: the oil agent (b) constituting the liquid-crystal composition is blended in an amount of 5% by mass or more relative to the total amount of the surfactant (a), the oil agent (b), and the water (c); and condition 3: a temperature at which the components constituting the liquid-crystal composition are mixed is a temperature equal to or higher than the melting point of the oil agent (b).

<Condition 1>

The condition 1 is to blend the surfactant (a) and the water (c) constituting the liquid-crystal composition of the present invention such that the ratio between them is a ratio that forms at least one structural body (x) selected from a hexagonal structural body and a pre-hexagonal structural body when mixing the surfactant (a) and the water (c). This is because the Fd-3m liquid crystal is formed when the oil agent (b) is mixed with the structural body (x) that has been formed from the surfactant (a) and the water (c).

The ratio between the surfactant (a) and the water (c) may be any ratio that forms the structural body (x) in a mixture obtained by mixing the surfactant (a) and the water (c), and is specifically a ratio in which the mass ratio (a)/((a)+(c)) is preferably in the above range.

<Condition 2>

The condition 2 is to blend the oil agent (b) constituting the liquid-crystal composition of the present invention such that the amount thereof is 5% by mass or more relative to the total amount of the surfactant (a), the oil agent (b), and the water (c). When the amount of oil agent (b) to be blended is in this range, the Fd-3m liquid crystal can be formed stably.

From the above viewpoint, the oil agent (b) is blended in an amount of preferably 10% by mass or more, more preferably 20% by mass or more, and still more preferably 25% by mass or more, and of preferably 85% by mass or less, more preferably 80% by mass or less, still more preferably 70% by mass or less, and further preferably 50% by mass or less, relative to the total amount of the surfactant (a), the oil agent (b), and the water (c).

<Condition 3>

The condition 3 is that a temperature at which the components constituting the liquid-crystal composition are mixed is a temperature equal to or higher than the melting point of the oil agent (b). By this, the liquid-crystal composition containing the Fd-3m liquid crystal can be obtained efficiently.

For example, when the oil agent (b) is a liquid at normal temperature (25° C.), each component constituting the liquid-crystal composition may be mixed at a temperature equal to or higher than the normal temperature. On the other hand, when the oil agent (b) is a solid at normal temperature, from the viewpoint of efficiently forming the Fd-3m liquid crystal, it is preferable to heat the oil agent (b) to a temperature equal to or higher than its melting point to melt it, and then mix it with other components in a molten state. At this time, all components constituting the liquid-crystal composition other than the oil agent (b) are also heated to a temperature equal to or higher than the melting point of the oil agent (b) and mixed with the oil agent (b).

In the production of the liquid-crystal composition of the present invention, the mixing order of the surfactant (a), the oil agent (b), and the water (c) is not particularly restricted.

For example, the components (a), (b), and (c) may be mixed at the same time, or the component (a) and the component (c) may be mixed to prepare a mixture containing the structural body (x), followed by mixing of the component (b). Alternatively, the component (a) and the component (b) may be mixed, followed by mixing of the component (c).

From the viewpoint of efficiently forming the Fd-3m liquid crystal, it is preferable that the method for producing the liquid-crystal composition of the present invention contains a step of mixing in advance at least a part of the surfactant (a) with at least a part of the oil agent (b). More preferably, the production method of the present invention is a method containing a step of mixing the entire amount of surfactant (a) and the entire amount of oil agent (b) in advance, followed by mixing of the component (c).

Even when the liquid-crystal composition of the present invention further contains the above components (d) and (e), there are no particular restrictions on their mixing order, but from the viewpoint of dissolving or dispersing them uniformly in the liquid-crystal composition, it is preferable that the component (d) is mixed with the water (c) in advance and then blended and it is preferable that the component (e) is mixed with the surfactant (a) or oil agent (b) in advance and then blended.

In the production of the liquid-crystal composition, the liquid-crystal composition of the present invention can be obtained by using a known stirring apparatus to stir each component constituting the liquid-crystal composition under conditions to the extent that no bubbles are generated, and then leaving the mixture to stand.

[Selection Method]

Furthermore, the present invention provides a method for selecting the surfactant (a) and the oil agent (b) constituting the liquid-crystal composition containing the Fd-3m liquid crystal.

The selection method of the present invention contains the following step 1 to step 3 in order:
- step 1: a step of selecting the surfactant (a) that is capable of forming at least one structural body (x) selected from a hexagonal structural body and a pre-hexagonal structural body when mixed with the water (c);
- step 2: a step of mixing the surfactant (a) and the water (c) at the ratio that forms the structural body (x) to prepare a mixture containing the structural body (x); and
- step 3: a step of mixing the mixture obtained in step 2 with an oil agent having the same mass as the surfactant (a) in the mixture to prepare a composition (L), and analyzing a structure of a structural body contained in the composition (L) by small angle X-ray scattering.

<Step 1>

In step 1, the surfactant (a) is selected that is capable of forming at least one structural body (x) selected from a hexagonal structural body and a pre-hexagonal structural body when mixed with the water (c).

Specifically, in step 1, a surfactant and water are mixed in an arbitrary ratio, for example, at a ratio of 1/1 by mass, and the SAXS measurement is carried out on the resulting mixture. At this time, when the angle formed between the repeating surface of the structural body and the X-ray is defined as $\theta$ (°) and the peaks of scattering pattern obtained with the horizontal axis as $2\theta$ and the vertical axis as intensity satisfies the following requirement (I) or (II), it is considered that at least one structural body (x) selected from a hexagonal structural body and a pre-hexagonal structural body is formed, and that surfactant can be selected as the surfactant (a). The mixing ratio of surfactant and water is arbitrary, as long as there is a mixing ratio that is capable of forming the structural body (x).

(I) A case where the peaks of scattering pattern appear at positions of $1:\sqrt{3}:2$. It is considered that a hexagonal structural body has been formed when the peak shape is sharp, and a pre-hexagonal structural body when it is broad. Whether the peak shape is sharp or broad can be determined by the full width at half maximum (FWHM) of the peak, and specifically, it can be determined by the method described in Examples.

(II) A case in which the above (I) does not apply, but broad peaks appear at positions that correspond to neither lamellar structural body nor cubic structural body.

Note that it is considered that a lamellar structural body has been formed when the peaks of scattering pattern appear at positions of $1:2:3:n$ . . . (n is an integer), and a cubic structural body belonging to body centered cubic when they appear at positions of $1:\sqrt{2}:\sqrt{3}:2$.

<Step 2>

In step 2, the surfactant (a) and the water (c) are mixed at the ratio that forms the structural body (x) to prepare a mixture containing the structural body (x).

In step 2, using the surfactant (a) selected in step 1, it may be mixed with the water (c) at the ratio that has been confirmed in step 1 to be capable of forming the structural body (x), thereby preparing the mixture.

<Step 3>

In step 3, the mixture obtained in step 2 is mixed with an oil agent having the same mass as the surfactant (a) in the mixture to prepare a composition (L), and the structure of a structural body contained in the composition (L) is analyzed by small angle X-ray scattering.

By mixing an oil agent having the same mass as the surfactant (a) in the mixture with the mixture obtained in step 2, whether that oil agent satisfies the requirements as the oil agent (b) can be found readily. Then, if, as a result of the analysis of the structure of a structural body contained in the composition (L) by small angle X-ray scattering (SAXS), it is found that the Fd-3m liquid crystal is contained in the composition (L), that oil agent can be selected as the oil agent (b) used in the present invention. Also, even if, as a result of analyzing the composition (L), it is found that the Fd-3m liquid crystal is not contained in the composition (L), unless only the lamellar structural body is observed as a clear periodic structure, there is a possibility that the Fd-3m liquid crystal can be formed depending on the mixing ratio with the structural body (x), and therefore, that oil agent can be selected as the oil agent (b). The SAXS measurement can be carried out by the same method as described above.

According to the selection method of the present invention, the surfactant (a) and the oil agent (b) constituting the liquid-crystal composition containing the Fd-3m liquid crystal can be selected by a simple method using the above procedures.

Note that the present invention does not exclude the use of a surfactant and an oil agent by which the presence of the Fd-3m liquid crystal cannot be confirmed in step 3 after going through the above step 1 to step 3, and as mentioned above, does not deny the possibility of formation of the Fd-3m liquid crystal depending on the blending ratio of the surfactant, oil agent, and water. There may also be the possibility of formation of the Fd-3m liquid crystal by, for example, a combination of two or more surfactants, a combination of two or more oil agents, or a combination thereof.

The liquid-crystal composition of the present invention is expected to have delivery performance for transporting a water-soluble component or water-dispersible component beyond an oil phase to an aqueous phase, which has not been known conventionally, and thus is anticipated to be deployed in a variety of application fields. Also, the liquid-crystal composition provides a different sense of use when applied and spread over a solid surface compared to conventional compositions. Specifically, when the liquid-crystal composition of the present invention is applied onto the skin, it can provide a feeling of being easily compatible with the skin, and is therefore expected to be applied to topical agents, for example.

With respect to the embodiments mentioned above, the present invention discloses the following liquid-crystal compositions, methods for producing the liquid-crystal compositions, and selection methods.

<1> A liquid-crystal composition containing a liquid crystal having an Fd-3m structure, wherein
the liquid-crystal composition is formed by blending a surfactant (a), an oil agent (b), and water (c);
the surfactant (a) is a surfactant, preferably nonionic surfactant, that is capable of forming at least one structural body (x) selected from a hexagonal structural body and a pre-hexagonal structural body when mixed with the water (c);
the oil agent (b) is an oil agent that does not convert all of the structural body (x) into a lamellar structural body, when mixed with the structural body (x), and that preferably has a functional group equivalent amount of a polar group selected from the group consisting of a hydroxy group, a carboxy group, an amino group, and an amide group of 300 g/equivalent amount or more, preferably 500 g/equivalent amount or more, more preferably 750 g/equivalent amount or more, and still more preferably 1,000 g/equivalent amount or more; and
a ratio between the surfactant (a) and the water (c) constituting the liquid-crystal composition is a ratio that forms the structural body (x) when mixing the surfactant (a) and the water (c).

<2> The liquid-crystal composition according to <1>, wherein the nonionic surfactant is a nonionic surfactant represented by the following general formula (a1) or general formula (a2):

$$R^{1a}\text{-}A[(R^{2a}O)_x\text{—}R^{3a}]_y \qquad (a1)$$

wherein $R^{1a}$ is a hydrocarbon group having 7 or more and 18 or less carbon atoms, and the number of carbon atoms in $R^{1a}$ is preferably 8 or more and more preferably 10 or more, and is preferably 16 or less; $R^{2a}$ is an alkylene group having 2 or 3 carbon atoms, preferably one or more selected from the group consisting of an ethylene group and a propylene group, and more preferably an ethylene group; multiple $R^{2a}$ may be the same as or different from each other; $R^{3a}$ is an alkyl group having 1 or more and 3 or less carbon atoms or a hydrogen atom, and is preferably a hydrogen atom; x is an average number of added moles, and is a number of 3 or more, preferably 4 or more, and more preferably 5 or more, and of 50 or less, preferably 45 or less, more preferably 40 or less, still more preferably 30 or less, further preferably 20 or less, and even further preferably 15 or less; A is —O—, —C(═O)O—, —C(═O)NH—, —C(═O)N═, —NH—, or —N═, and y is 1 when A is —O—, —C(═O)O—, —C(═O)NH—, or —NH— and y is 2 when A is —C(═O)N═ or —N═; and A is preferably —O— or —C(═O)O—, and is more preferably —O—,

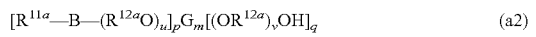

$$[R^{11a}\text{—}B\text{—}(R^{12a}O)_u]_pG_m[(OR^{12a})_vOH]_q \qquad (a2)$$

wherein $R^{11a}$ represents a hydrocarbon group having 7 or more and 18 or less carbon atoms, and the number of carbon atoms in $R^{11a}$ is preferably 8 or more and more preferably 10 or more, and is preferably 17 or less; $R^{12a}$ represents an alkylene group having 2 or more and 4 or less carbon atoms, and is preferably an alkylene group having 2 or more and 3 or less carbon atoms, more preferably one or more selected from the group consisting of an ethylene group and a propylene group, and still more preferably an ethylene group; multiple $R^{12a}$ may be the same as or different from each other; u and v are average numbers of added moles and are each independently a number of 0 or more and 40 or less, and u×p+v×q is 0 or more and 40 or less; G represents a polyhydric alcohol residue having 3 or more and 10 or less, preferably 8 or less, and more preferably 6 or less carbon atoms, and having 3 or more and 10 or less, preferably 8 or less, and more preferably 6 or less hydroxy groups, and the polyhydric alcohol residue is preferably one or more selected from the group consisting of a glycerin residue, a sugar residue, and a sugar alcohol residue; the sugar residue is preferably a residue derived from one or more monosaccharides selected from the group consisting of ribose, glucose, fructose, and galactose, and the sugar alcohol residue is preferably a residue derived from one or more sugar alcohols selected from the group consisting of sorbitol, sorbitan, erythritol, pentaerythritol, and xylitol; G is preferably one or more selected from the group consisting of a glycerin residue, a glucose residue, a fructose residue, a sorbitan residue, and a pentaerythritol residue; m is an average condensation degree of G and is a number of 1 or more and 10 or less, preferably 5 or less; when G is a sugar residue and the degree of condensation is 2 or more, $G_m$ may be a sucrose-derived residue (sucrose residue) in which two or more monosaccharides are condensed; $G_m$ is more preferably a polyglucoside residue in which G is a glucose residue and m is a number of 1 or more and 10 or less, or a sucrose residue in which glucose and fructose are condensed; p is 1 or more and is a number equal to or less than the number of hydroxy groups of $G_m$, and q is a number of the number of hydroxy groups of $G_m$-p; and B is —O— or —C(═O)O—, and is preferably —C(═O)O—.

<3> The liquid-crystal composition according to <2>, wherein the nonionic surfactant represented by the above general formula (a1) is a compound represented by the following formula (a1-1):

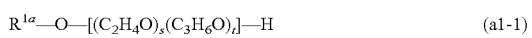

$$R^{1a}\text{—}O\text{—}[(C_2H_4O)_s(C_3H_6O)_t]\text{—}H \qquad (a1\text{-}1)$$

wherein $R^{1a}$ is preferably an alkyl group or alkenyl group having 8 or more and 18 or less carbon atoms, more preferably an alkyl group or alkenyl group having 10 or more and 16 or less carbon atoms, and still more preferably a linear alkyl group or linear alkenyl group having 10 or more and 16 or less carbon atoms; s is an average number of added moles, and is a number of 3 or more, preferably 4 or more, and more preferably 5 or more, and of 40 or less, preferably 30 or less, more preferably 20 or less, and still more preferably 15 or less; t is an average number of added moles, is a number of 0 or more and 5 or less, preferably 3 or less, and is more preferably 0; and a bonding order of $(C_2H_4O)$ and $(C_3H_6O)$ can be any, and a bonding scheme of $(C_2H_4O)$ and $(C_3H_6O)$ can be either random bonding or block bonding.

<4> The liquid-crystal composition according to <3>, wherein the compound represented by the above formula (a1-1) is a polyoxyalkylene alkyl ether or polyoxyalkylene alkenyl ether in which the alkyl group or alkenyl group has 8 or more and 18 or less, preferably 10 or more and 16 or less carbon atoms, the average number of added moles of oxyethylene groups is 3 moles or more and 40 moles or less, preferably 3 moles or more and 30 moles or less, more preferably 4 moles or more and 20 moles or less, still more preferably 4 moles or more and 15 moles or less, and further preferably 5 moles or more and 15 moles or less, and the average number of added moles of oxypropylene groups is 5 moles or less, preferably 0 moles, and is more preferably a polyoxyethylene alkyl ether or polyoxyethylene alkenyl ether in which the alkyl group or alkenyl group is a linear alkyl group or linear alkenyl group having 8 or more and 18 or less, preferably 10 or more and 16 or less carbon atoms, and the average number of added moles of oxyethylene groups is 3 moles or more and 40 moles or less, preferably 3 moles or more and 30 moles or less, more preferably 4 moles or more and 20 moles or less, still more preferably 4 moles or more and 15 moles or less, and further preferably 5 moles or more and 15 moles or less.

<5> The liquid-crystal composition according to <4>, wherein the compound represented by the formula (a1-1) is one or more selected from the group consisting of polyoxyethylene 2-ethylhexyl ether, polyoxyethylene decyl ether, polyoxyethylene dodecyl ether, polyoxyethylene tridecyl ether, polyoxyethylene tetradecyl ether, polyoxyethylene hexadecane ether, and polyoxyethylene octadecane ether in which the average number of added moles of oxyethylene groups is 3 moles or more and 40 moles or less, preferably 3 moles or more and 30 moles or less, more preferably 4 moles or more and 20 moles or less, still more preferably 4 moles or more and 15 moles or less, and further preferably 5 moles or more and 15 moles or less, and is preferably one or more selected from the group consisting of polyoxyethylene lauryl ether, polyoxyethylene myristyl ether, polyoxyethylene palmityl ether, and polyoxyethylene stearyl ether in which the average number of added moles of oxyethylene groups is 3 moles or more and 40 moles or less, preferably 3 moles or more and 30 moles or less, more preferably 4 moles or more and 20 moles or less, still more preferably 4 moles or more and 15 moles or less, and further preferably 5 moles or more and 15 moles or less.

<6> The liquid-crystal composition according to any one of <3> to <5>, wherein the nonionic surfactant represented by the above general formula (a2) is any of the following compounds (a2-1) to (a2-5):
  (a2-1) a sorbitan mono- or di-fatty acid ester in which the constituent fatty acid is a saturated or unsaturated fatty acid having 8 or more and 18 or less carbon atoms and the average number of added moles of oxyethylene groups is 0 or more and 40 or less;
  (a2-2) a pentaerythritol fatty acid ester in which the constituent fatty acid is a saturated or unsaturated fatty acid having 8 or more and 18 or less carbon atoms, the average number of added moles of oxyethylene groups is 0 or more and 40 or less, and the ratio of monoester is 60% by mol or more and 90% by mol or less;
  (a2-3) a sucrose fatty acid ester in which the constituent fatty acid is a saturated or unsaturated fatty acid having 8 or more and 18 or less carbon atoms and the ratio of monoester is 60% by mol or more and 90% by mol or less;
  (a2-4) a polyoxyethylene glycerin mono- or di-fatty acid ester in which the constituent fatty acid is a saturated or unsaturated fatty acid having 8 or more and 18 or less carbon atoms and the average number of added moles of oxyethylene groups is 1 or more and 40 or less; and
  (a2-5) a monoalkyl glycoside in which the alkyl group has 8 or more and 18 or less, preferably 10 or more and 17 or less carbon atoms, the average number of added moles of oxyethylene groups is 0 or more and 20 or less, and the average condensation degree of sugar is 1 or more and 10 or less.

<7> The liquid-crystal composition according to <6>, wherein the compound (a2-1) is one or more selected from the group consisting of a sorbitan fatty acid monoester or diester in which the constituent fatty acid is 2-ethylhexanoic acid, lauric acid, myristic acid, pentadecanoic acid, palmitic acid, palmitoleic acid, margaric acid, stearic acid, oleic acid, or linoleic acid; and a polyoxyethylene sorbitan fatty acid monoester or diester in which the constituent fatty acid is 2-ethylhexanoic acid, lauric acid, myristic acid, pentadecanoic acid, palmitic acid, palmitoleic acid, margaric acid, stearic acid, oleic acid, or linoleic acid and the average number of added moles of oxyethylene groups is 1 or more and 40 or less.

<8> The liquid-crystal composition according to <6> or <7>, wherein the compound (a2-2) is a pentaerythritol fatty acid ester in which the constituent fatty acid is 2-ethylhexanoic acid, lauric acid, myristic acid, pentadecanoic acid, palmitic acid, palmitoleic acid, margaric acid, stearic acid, oleic acid, or linoleic acid, the average number of added moles of oxyethylene groups is 0 or more and 40 or less, and the ratio of monoester is 60% by mol or more and 90% by mol or less, and is preferably one or more selected from the group consisting of pentaerythritol 2-ethylhexanoate, pentaerythritol laurate, pentaerythritol myristate, pentaerythritol pentadecanoate, pentaerythritol palmitate, pentaerythritol palmitoleate, pentaerythritol margarate, pentaerythritol stearate, pentaerythritol oleate, and pentaerythritol linoleate in which the average number of added moles of oxyethylene groups is 0 or more and 40 or less and the ratio of monoester is 60% by mol or more and 90% by mol or less.

<9> The liquid-crystal composition according to any one of <6> to <8>, wherein the compound (a2-3) is a sucrose fatty acid ester in which the constituent fatty acid is 2-ethylhexanoic acid, lauric acid, myristic acid, pentadecanoic acid, palmitic acid, palmitoleic acid, margaric acid, stearic acid, oleic acid, or linoleic acid and the ratio of monoester is 60% by mol or more and 90% by mol or less, and is preferably one or more selected from the group consisting of sucrose 2-ethylhexanoate, sucrose laurate, sucrose myristate, sucrose pentadecanoate, sucrose palmitate, sucrose palmitoleate, sucrose margarate, sucrose stearate, sucrose oleate, and sucrose linoleate in which the ratio of monoester is 60% by mol or more and 90% by mol or less.

<10> The liquid-crystal composition according to any one of <6> to <9>, wherein the compound (a2-4) is a polyoxyethylene glycerin mono- or di-fatty acid ester in which the constituent fatty acid is 2-ethylhexanoic acid, lauric acid, myristic acid, pentadecanoic acid, palmitic acid, palmitoleic acid, margaric acid, stearic acid, oleic acid, or linoleic acid and the average number of added moles of oxyethylene groups is 1 or more and 40 or less.

<11> The liquid-crystal composition according to any one of <6> to <10>, wherein the compound (a2-5) is one or more selected from the group consisting of monooctyl (poly)glucoside, monodecyl (poly)glucoside, monolauryl (poly)glucoside, monomyristyl (poly)glucoside, monopentadecyl (poly)glucoside, monopalmityl (poly)glucoside, monopalmitoleyl (poly)glucoside, monostearyl (poly)glucoside, and monooleyl (poly)glucoside in which the average condensation degree of sugar is 1 or more and 10 or less, preferably 1 or more and 5 or less; and polyoxyethylene monooctyl (poly)glucoside, polyoxyethylene monodecyl (poly)glucoside, polyoxyethylene monolauryl (poly)glucoside, polyoxyethylene monomyristyl (poly)glucoside, polyoxyethylene monopentadecyl (poly)glucoside, polyoxyethylene monopalmityl (poly)glucoside, polyoxyethylene monopalmitoleyl (poly)glucoside, polyoxyethylene monostearyl (poly)glucoside, and polyoxyethylene monooleyl (poly)glucoside in which the average number of added moles of oxyethylene groups is 1 or more and 20 or less and the average condensation degree of sugar is 1 or more and 10 or less.

<12> The liquid-crystal composition according to any one of <6> to <11>, wherein the surfactant (a) is one or more selected from the group consisting of the compound represented by the above formula (a1-1) and the compounds (a2-1) to (a2-5), preferably one or more selected from the group consisting of the compound represented by the above formula (a1-1), the compound (a2-1), and the compound (a2-3), and more preferably one or more selected from the group consisting of polyoxyethylene lauryl ether in which the average number of added moles of oxyethylene groups is 3 moles or more and 20 moles or less, polyoxyethylene sorbitan monooleate or dioleate in which the average number of added moles of oxyethylene groups is 1 or more and 40 or less, and sucrose laurate in which the ratio of monoester is 60% by mol or more and 90% by mol or less.

<13> The liquid-crystal composition according to any one of <3> to <12>, wherein, in the nonionic surfactant represented by the above general formula (a1) and the nonionic surfactant represented by the above general formula (a2) (except for a case where u=v=0), when the nonionic surfactant has an average number of added moles of oxyalkylene groups in the nonionic surfactant of n, the surfactant contains a component having a number of added moles of oxyalkylene groups of n with a content of 0% by mass or more, preferably 0.1% by mass or more, more preferably 0.5% by mass or more, and still more preferably 1% by mass or more, and of preferably 80% by mass or less, more preferably 60% by mass or less, still more preferably 50% by mass or less, and further preferably 40% by mass or less, the surfactant contains a component having a number of added moles of oxyalkylene groups of n+1 to n+10 with a content of preferably 0.5% by mass or more, more preferably 1% by mass or more, and still more preferably 2% by mass or more, and of preferably 80% by mass or less, more preferably 70% by mass or less, and still more preferably 60% by mass or less, and a component in which n is 0 with a content of preferably 0% by mass or more and 20% by mass or less, more preferably 18% by mass or less, and still more preferably 15% by mass or less.

<14> The liquid-crystal composition according to any one of <1> to <13>, wherein the oil agent (b) has a melting point of lower than 100° C., preferably 80° C. or lower, more preferably 50° C. or lower, and still more preferably 20° C. or lower.

<15> The liquid-crystal composition according to any one of <1> to <14>, wherein the oil agent (b) has a molecular weight of preferably 1,500 or less, more preferably 1,200 or less, and still more preferably 1,000 or less, and of preferably 100 or more, more preferably 120 or more, still more preferably 150 or more, and further preferably 200 or more.

<16> The liquid-crystal composition according to any one of <1> to <15>, wherein the oil agent (b) contains oxyalkylene groups having 2 or more and 4 or less carbon atoms with a content of preferably 25% by mass or less, more preferably 15% by mass or less, still more preferably 10% by mass or less, and further preferably substantially 0% by mass.

<17> The liquid-crystal composition according to any one of <1> to <16>, wherein the oil agent (b) is one or more selected from the group consisting of a hydrocarbon oil and an ester oil; preferably one or more selected from the group consisting of (i) a hydrocarbon oil having 8 or more and 36 or less carbon atoms, (ii) a fatty acid monoester formed of a fatty acid having 8 or more and 22 or less carbon atoms and a monohydric alcohol having 1 or more and 24 or less carbon atoms, (iii) a fatty acid diester formed of a fatty acid having 8 or more and 22 or less carbon atoms and a dihydric alcohol having 1 or more and 12 or less carbon atoms, (iv) a dicarboxylic acid diester formed of a dicarboxylic acid having 4 or more and 18 or less carbon atoms and a monohydric alcohol having 1 or more and 24 or less carbon atoms, (v) a tricarboxylic acid triester formed of a tricarboxylic acid having 5 or more and 12 or less carbon atoms and a monohydric alcohol having 1 or more and 24 or less carbon atoms, and (vi) a glycerin fatty acid triester; more preferably one or more selected from the group consisting of (i) a hydrocarbon oil having 8 or more and 36 or less carbon atoms, (ii) a fatty acid monoester formed of a fatty acid having 8 or more and 22 or less carbon atoms and a monohydric alcohol having 1 or more and 24 or less carbon atoms, (iv) a dicarboxylic acid diester formed of a dicarboxylic acid having 4 or more and 18 or less carbon atoms and a monohydric alcohol having 1 or more and 24 or less carbon atoms, (v) a tricarboxylic acid triester formed of a tricarboxylic acid having 5 or more and 12 or less carbon atoms and a monohydric alcohol having 1 or more and 24 or less carbon atoms, and (vi) a glycerin fatty acid triester; and still more preferably one or more selected from the group consisting of octane, decane, undecane, dodecane, isododecane, tridecane, tetradecane, hexadecane, octadecane, squalane, squalene, cetyl 2-ethylhexanoate, isopropyl myristate, hexadecyl myristate, 2-octyldodecyl myristate, isopropyl palmitate, hexadecyl palmitate, 2-ethylhexyl stearate, diisobutyl adipate, diisononyl phthalate, triisodecyl trimellitate, triolein, tristearin, and triglyceride 2-ethylhexanoate.

<18> The liquid-crystal composition according to any one of <1> to <17>, wherein the liquid-crystal composition contains the surfactant (a) with a content of preferably 1% by mass or more, more preferably 2% by mass or more, still more preferably 3% by mass or more, further preferably 5% by mass or more, and even further preferably 10% by mass or more, and of preferably 70% by mass or less, more preferably 60% by mass or less, still more preferably 50% by mass or less, further preferably 45% by mass or less, and even further preferably 40% by mass or less.

<19> The liquid-crystal composition according to any one of <3> to <18>, wherein, when the surfactant (a) is the nonionic surfactant represented by the above general formula (a1) or general formula (a2), the ratio between the surfactant (a) and the water (c) constituting the liquid-crystal composition is preferably 0.05 or more, more preferably 0.1 or more, still more preferably 0.2 or more, and further preferably 0.3 or more, and is preferably 1 or less, more preferably 0.9 or less, still more preferably 0.8 or less, and further preferably 0.7 or less, as a mass ratio of the component (a) to a total amount of the component (a) and the component (c), (a)/((a)+(c)).

<20> The liquid-crystal composition according to any one of <1> to <19>, wherein the liquid-crystal composition contains the oil agent (b) with a content of preferably 0.01 or more, more preferably 0.05 or more, still more preferably 0.1 or more, and further preferably 0.5 or more, and of preferably 500 or less, more preferably 100 or less, still more preferably 10 or less, and further preferably 5 or less, as a mass ratio relative to the surfactant (a), (b)/(a).

<21> The liquid-crystal composition according to any one of <1> to <20>, wherein the liquid-crystal composition contains the oil agent (b) with a content of preferably 5% by mass or more, more preferably 10% by mass or more, still more preferably 20% by mass or more, and further preferably 25% by mass or more, and of preferably 85% by mass or less, more preferably 80% by mass or less, still more preferably 70% by mass or less, further preferably 50% by mass or less, and even further preferably 45% by mass or less, relative to a total amount of the surfactant (a), the oil agent (b), and the water (c).

<22> The liquid-crystal composition according to any one of <1> to <21>, wherein the liquid-crystal composition contains the component (a), the component (b), and the component (c) with a total content of preferably 5% by mass or more, more preferably 10% by mass or more, still more preferably 30% by mass or more, further preferably 50% by mass or more, even further preferably 70% by mass or more, still further preferably 80% by mass or more, and yet further preferably 90% by mass or more, and of 100% by mass or less.

<23> The liquid-crystal composition according to any one of <1> to <22>, further containing a water-soluble or water-dispersible functional component (d), preferably water-soluble functional component, in an amount of preferably 0.0001% by mass or more, 0.01% by mass or more, 1% by mass or more, or 10% by mass or more, and of preferably 40% by mass or less, more preferably 30% by mass or less.

<24> The liquid-crystal composition according to <23>, wherein the component (d) is one or more selected from the group consisting of a water-soluble coloring matter, a flavor, a disinfectant, a chemical agent, a bleaching agent, an enzyme, and an alkaline agent.

<25> The liquid-crystal composition according to any one of <1> to <24>, further containing an oil soluble functional component (e) in an amount of preferably 0.0001% by mass or more, 0.01% by mass or more, 1% by mass or more, or 10% by mass or more, and of preferably 40% by mass or less, more preferably 30% by mass or less.

<26> The liquid-crystal composition according to <25>, wherein the component (e) is one or more selected from the group consisting of a pigment, a moisturizing agent, a lubricating agent, an oil soluble flavor, and a chemical agent.

<27> The liquid-crystal composition according to any one of <1> to <26>, wherein the liquid-crystal composition contains an oil agent (b') other than the component (b) with a content of preferably 0.40 or less, more preferably 0.20 or less, still more preferably 0.10 or less, further preferably 0.05 or less, and even further preferably 0, as a mass ratio relative to a total amount of the oil agent (b) and the oil agent (b'), (b')/((b)+(b')).

<28> A liquid-crystal composition containing a liquid crystal having an Fd-3m structure, wherein
the liquid-crystal composition is formed by blending a surfactant (a), an oil agent (b), and water (c);
the surfactant (a) is a surfactant that is capable of forming at least one structural body (x) selected from a hexagonal structural body and a pre-hexagonal structural body when mixed with the water (c), and is one or more selected from the group consisting of polyoxyethylene lauryl ether in which an average number of added moles of oxyethylene groups is 3 moles or more and 20 moles or less, polyoxyethylene sorbitan monooleate or dioleate in which an average number of added moles of oxyethylene groups is 1 or more and 40 or less, and sucrose laurate in which a ratio of monoester is 60% by mol or more and 90% by mol or less;
the oil agent (b) is an oil agent that does not convert all of the structural body (x) into a lamellar structural body, when mixed with the structural body (x), and is one or more selected from the group consisting of octane, decane, undecane, dodecane, isododecane, tridecane, tetradecane, hexadecane, octadecane, squalane, squalene, cetyl 2-ethylhexanoate, isopropyl myristate, hexadecyl myristate, 2-octyldodecyl myristate, isopropyl palmitate, hexadecyl palmitate, 2-ethylhexyl stearate, diisobutyl adipate, diisononyl phthalate, triisodecyl trimellitate, triolein, tristearin, and triglyceride 2-ethylhexanoate;
a ratio between the surfactant (a) and the water (c) constituting the liquid-crystal composition is a ratio that forms the structural body (x) when mixing the surfactant (a) and the water (c);
the liquid-crystal composition contains the surfactant (a) with a content of 1% by mass or more and 70% by mass or less;
the ratio between the surfactant (a) and the water (c) constituting the liquid-crystal composition is 0.05 or more and 0.95 or less as a mass ratio of the component (a) to a total amount of the component (a) and the component (c), (a)/((a)+(c));
the liquid-crystal composition contains the oil agent (b) with a content of 5% by mass or more and 85% by mass or less relative to a total amount of the surfactant (a), the oil agent (b), and the water (c);
the liquid-crystal composition contains an oil agent (b') other than the component (b) with a content of 0.40 or less as a mass ratio relative to a total amount of the oil agent (b) and the oil agent (b), (b)/((b)+(b')); and
the liquid-crystal composition contains the component (a), the component (b), and the component (c) with a total content of 80% by mass or more and 100% by mass or less.

<29> A liquid-crystal composition containing a liquid crystal having an Fd-3m structure, wherein
the liquid-crystal composition is formed by blending a surfactant (a), an oil agent (b), and water (c);
the surfactant (a) is a surfactant that is capable of forming at least one structural body (x) selected from a hexagonal structural body and a pre-hexagonal structural body when mixed with the water (c), and is one or more selected from the group consisting of polyoxyethylene lauryl ether in which an average number of added moles of oxyethylene groups is 3 moles or more and 20 moles or less, polyoxyethylene sorbitan monooleate or dioleate in which an average number of added moles of oxyethylene groups is 1 or more and 40 or less, and sucrose laurate in which a ratio of monoester is 60% by mol or more and 90% by mol or less;
the oil agent (b) is an oil agent that does not convert all of the structural body (x) into a lamellar structural body, when mixed with the structural body (x), and is one or more selected from the group consisting of octane, decane, undecane, dodecane, isododecane, tridecane, tetradecane, hexadecane, octadecane, squalane, squalene, cetyl 2-ethylhexanoate, isopropyl myristate, hexadecyl myristate, 2-octyldodecyl myristate, isopropyl palmitate, hexadecyl palmitate, 2-ethylhexyl stearate, diisobutyl adipate, diisononyl phthalate, triisodecyl trimellitate, triolein, tristearin, and triglyceride 2-ethylhexanoate;

a ratio between the surfactant (a) and the water (c) constituting the liquid-crystal composition is a ratio that forms the structural body (x) when mixing the surfactant (a) and the water (c);

the liquid-crystal composition contains the surfactant (a) with a content of 1% by mass or more and 70% by mass or less;

the liquid-crystal composition contains the oil agent (b) with a content of preferably 0.01 or more and 500 or less as a mass ratio relative to the surfactant (a), (b)/(a);

the ratio between the surfactant (a) and the water (c) constituting the liquid-crystal composition is 0.05 or more and 0.95 or less as a mass ratio of the surfactant (a) to a total amount of the surfactant (a) and the water (c), (a)/((a)+(c));

the liquid-crystal composition contains an oil agent (b') other than the component (b) with a content of 0.40 or less as a mass ratio relative to a total amount of the oil agent (b) and the oil agent (b'), (b')/((b)+(b')); and the liquid-crystal composition contains the component (a), the component (b), and the component (c) with a total content of 80% by mass or more and 100% by mass or less.

<30> A method for producing the liquid-crystal composition according to any one of <1> to <29>, containing blending the surfactant (a), the oil agent (b), and the water (c) constituting the liquid-crystal composition so as to satisfy the following conditions 1 to 3:

condition 1: the ratio between the surfactant (a) and the water (c) constituting the liquid-crystal composition is a ratio that forms at least one structural body (x) selected from a hexagonal structural body and a pre-hexagonal structural body when mixing the surfactant (a) and the water (c);

condition 2: the oil agent (b) constituting the liquid-crystal composition is blended in an amount of 5% by mass or more, preferably 10% by mass or more, more preferably 20% by mass or more, and still more preferably 25% by mass or more, and of preferably 85% by mass or less, more preferably 80% by mass or less, still more preferably 70% by mass or less, and further preferably 50% by mass or less, relative to a total amount of the surfactant (a), the oil agent (b), and the water (c); and condition 3: a temperature at which the components constituting the liquid-crystal composition are mixed is a temperature equal to or higher than a melting point of the oil agent (b).

<31> The production method according to <30>, containing a step of mixing in advance at least a part of the surfactant (a) with at least a part of the oil agent (b).

<32> A method for selecting the surfactant (a) and the oil agent (b) constituting the liquid-crystal composition according to any one of <1> to <29>, containing the following step 1 to step 3 in order:

step 1: a step of selecting the surfactant (a) that is capable of forming at least one structural body (x) selected from a hexagonal structural body and a pre-hexagonal structural body when mixed with the water (c);

step 2: a step of mixing the surfactant (a) and the water (c) at the ratio that forms the structural body (x) to prepare a mixture containing the structural body (x); and step 3: a step of mixing the mixture obtained in step 2 with an oil agent having the same mass as the surfactant (a) in the mixture to prepare a composition (L), and analyzing a structure of a structural body contained in the composition (L) by small angle X-ray scattering.

EXAMPLES

Hereinafter, the present invention will be described with reference to Examples, but the present invention is not limited to the range of Examples. Note that the measurements and evaluations in Examples were carried out by the following methods.

<Compositional Analysis of Polyoxyethylene Lauryl Ether>

In polyoxyethylene lauryl ether, which is the component (a), the average number of added moles of oxyethylene groups, n, as well as the contents of a component having a number of added moles of oxyethylene groups of n and components having a number of added moles of oxyethylene groups of 0 and n+1 to n+10 in polyoxyethylene lauryl ether are measured by the method shown below.

0.06 g of polyoxyethylene lauryl ether, 0.06 g of 3,5-dinitrobenzoic acid chloride, and 0.03 g of triethylamine were dissolved in 5 mL of acetonitrile, held at 60° C. for 30 minutes, and then diluted with 15 mL of acetonitrile. Using the resulting sample, analysis was carried out by high performance liquid chromatography (Agilent 1260 Infinity (manufactured by Agilent Technologies, Inc.)) under the following conditions.

Column: 1 Wakosil 5C18 (4.6×250 mm) (manufactured by FUJIFILM Wako Pure Chemical Corporation)
Injection volume: 20 μL
Flow rate: 1 mL/min.
Eluent: water/acetonitrile (22/78) (volume ratio)
Detection: UV detector
Oven temperature: 40° C.

[Calculation of Compositional Features of Components]

From the peak area ratio of the obtained chart, the mass ratio of components constituting polyoxyethylene lauryl ether for each number of added moles of oxyethylene was calculated.

<Confirmation of Structural Body Formed by Mixing of Component (a) and Component (c)>

The surfactant (component (a)) described in a table and deionized water (component (c)) were blended in the amounts shown in the table and mixed using a vortex mixer to prepare a mixture of the component (a) and the component (c). This mixture was analyzed by small angle X-ray scattering (SAXS) to confirm the structure of the formed structural body. A small angle scattering measurement apparatus ("NANO-Viewer" manufactured by Rigaku Corporation) was used for the analysis, and the mixture was filled into a ring-shaped folder with a diameter of 5 mm and a thickness of 1.0 mm, both sides of the folder were covered with Kapton® films, and the measurement was carried out under the following conditions.

[Measurement Conditions]

X-ray source: Cu-Kα radiation (rotating anticathode)
X-ray generating conditions: acceleration voltage 40 kV and current 30 mA
Pinhole slit diameters: 1st 0.4 mm, 2nd 0.2 mm, and 3rd 0.45 mm
Camera length: 525 mm (determined using the 1.5130 (Cu, Kα) peak of silver behenate)
Sample temperature: 25° C.
Exposure time: 5 minutes In the scattering pattern obtained as a result of the measurement (the angle formed between the repeating surface of the structural body and the X-ray was defined as θ (°) and the scattering pattern was obtained with the horizontal axis as 2θ and the vertical axis as intensity), if the peak resolution was unclear, peak splitting was carried out using a combination of Gaussian functions. Those with full width at half maximum (FWHM) less than 0.1° (Cu, Kα), calculated from the value of variance of the Gaussian function, were considered as sharp peaks, and those with FWHM of equal to or greater than 0.1° (Cu, Kα) were considered as broad peaks. When sharp peaks of the scattering pattern appeared at positions of $1:\sqrt{3}:2$, it was identified as formation of a hexagonal structural body. Also, when broad peaks appeared at positions of $1:\sqrt{3}:2$, or when broad peaks appeared at positions that did not correspond to any of the following lamellar structural body or cubic structural body, it was identified as formation of a pre-hexagonal structural body.

On the other hand, it was identified that a lamellar structural body had been formed when the peaks of scattering pattern appeared at positions of 1:2:3:n . . . (n is an integer), and a cubic structural body belonging to body centered cubic when they appeared at positions of $1:\sqrt{2}:\sqrt{3}:2$. Furthermore, when the angle formed between the crystal plane of the structural body and the X-ray was defined as θ, it was identified that a micelle structural body had been formed if no periodic structure based on Bragg's formula was observed between 2θ=0.5° and 5°. Bragg's formula is as follows, wherein n represents an integer.

$$2d \sin θ = nλ$$

d: spacing between crystal planes
θ: angle formed between crystal plane and X-ray
λ: X-ray wavelength <Selection of Component (b)>

The surfactant (component (a)) described in a table and deionized water (component (c)) were blended in the amounts shown in the table and mixed using a vortex mixer to prepare a mixture of the component (a) and the component (c). To this mixture, an oil agent having the same mass as the component (a) was added and mixed to prepare a composition (L). This composition (L) was analyzed by small angle X-ray scattering (SAXS) under the same conditions as described above to confirm the structure of a structural body contained in the composition (L). As a result of the measurement, an oil agent in which only the lamellar structural body was detected from the peaks of the obtained scattering pattern was considered as "oil agent (b')", and the other oil agents were selected as the "oil agent (b)".

<Confirmation of Presence or Absence of Fd-3m Liquid Crystal in Composition>

The presence or absence of the Fd-3m liquid crystal in the compositions obtained in each example was confirmed by analysis using small angle X-ray scattering (SAXS), in the same manner as described above. The exposure time was extended as needed, and if the peak resolution in the obtained scattering pattern was unclear, peak splitting was carried out using a Gaussian function, and when the peak positions satisfied $\sqrt{3}:\sqrt{8}:\sqrt{11}:\sqrt{12}:\sqrt{16}$, it was identified that the composition contains the Fd-3m liquid crystal.

Examples 1 to 107 and Comparative Examples 1 to 46 (Preparation and Evaluation of Compositions)

The surfactant (component (a)) described in a table and the oil agent (b) or (b') were blended in the amounts shown in the table, heated to 95° C., and stirred using a vortex mixer to prepare a mixture of the component (a) and the component (b) or (b). The deionized water (c) was blended with this mixture and the temperature was raised to 95° C. again. The mixture was air cooled while stirring it using a vortex mixer, and the stirring was continued until the liquid temperature reached near room temperature (25° C.), thereby preparing a composition with the compositional features shown in the table. Note that the melting points of the oil agents (b) or (b') used in Examples and Comparative Examples are all lower than 95° C.

For the obtained compositions, the presence or absence of the Fd-3m liquid crystal was confirmed by the method described above. The results are shown in Tables 1 to 8.

TABLE 1

| | | | Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Compositional blending | (a) | (a-1) Polyoxyethylene lauryl ether (g) | 2.60 | 3.25 | 4.04 | 3.04 | 3.63 | 2.76 | 2.99 | 3.35 | 3.40 | 3.45 | 4.34 |
| | (b) | (b-1) Triolein (g) | 3.39 | 2.74 | 1.96 | 2.97 | 2.37 | 2.75 | 2.99 | 3.35 | 3.40 | 3.45 | 1.32 |
| | (c) | Deionized water (g) | 4.01 | 4.01 | 4.00 | 3.99 | 4.00 | 4.49 | 4.02 | 3.30 | 3.20 | 3.10 | 4.34 |
| Average number of added moles of oxyethylene groups in component (a), n | | | 6 | 6 | 6 | 6 | 6 | 6 | 6 | 6 | 6 | 6 | 6 |
| Content of component having a number of added moles of oxyethylene groups of n in component (a) (% by mass) | | | 9.2 | 9.2 | 9.2 | 9.2 | 9.2 | 9.2 | 9.2 | 9.2 | 9.2 | 9.2 | 9.2 |
| Content of component having a number of added moles of oxyethylene groups of n + 1 to n + 10 in component (a) (% by mass) | | | 54.7 | 54.7 | 54.7 | 54.7 | 54.7 | 54.7 | 54.7 | 54.7 | 54.7 | 54.7 | 54.7 |
| Content of component having a number of added moles of oxyethylene groups of 0 in component (a) (% by mass) | | | 2.9 | 2.9 | 2.9 | 2.9 | 2.9 | 2.9 | 2.9 | 2.9 | 2.9 | 2.9 | 2.9 |
| Content of component (a) in composition (% by mass) | | | 26.0 | 32.5 | 40.4 | 30.4 | 36.3 | 27.6 | 29.9 | 33.5 | 34.0 | 34.5 | 43.4 |

TABLE 1-continued

| | | | | | | | | | | |
|---|---|---|---|---|---|---|---|---|---|---|
| Content of component (b) in composition (% by mass) | 33.9 | 27.4 | 19.6 | 29.7 | 23.7 | 27.5 | 29.9 | 33.5 | 34.0 | 34.5 | 13.2 |
| Content of component (c) in composition (% by mass) | 40.1 | 40.1 | 40.0 | 39.9 | 40.0 | 44.9 | 40.2 | 33.0 | 32.0 | 31.0 | 43.4 |
| Mass ratio (a/(a + c)) | 0.39 | 0.45 | 0.50 | 0.43 | 0.48 | 0.38 | 0.43 | 0.50 | 0.52 | 0.53 | 0.50 |
| Mass ratio b/a | 1.30 | 0.843 | 0.485 | 0.977 | 0.653 | 1.00 | 1.00 | 1.00 | 1.00 | 1.00 | 0.304 |
| Evaluation results — Structural body formed by mixing of component (a) and component (c) *1 | H + preH | H + preH | H + preH | H + preH | H + preH | H + preH | H + preH | H + preH | H + preH | H + preH | H + preH |
| Presence or absence of Fd-3m liquid crystal in composition | Present | Present | Present | Present | Present | Present | Present | Present | Present | Present | Present |

| | | | | Examples | | | | | |
|---|---|---|---|---|---|---|---|---|---|
| | | 12 | 13 | 14 | 15 | 16 | 17 | 18 | 19 | 20 |
| Compositional blending | (a) (a-1) Polyoxyethylene lauryl ether (g) | 3.49 | 4.74 | 4.51 | 4.24 | 3.99 | 3.73 | 3.49 | 2.74 | 2.51 |
| | (b) (b-1) Triolein (g) | 1.30 | 0.50 | 1.00 | 1.50 | 2.00 | 2.53 | 3.01 | 4.51 | 4.99 |
| | (c) Deionized water (g) | 5.21 | 4.76 | 4.49 | 4.26 | 4.01 | 3.74 | 3.50 | 2.75 | 2.50 |
| Average number of added moles of oxyethylene groups in component (a), n | | 6 | 6 | 6 | 6 | 6 | 6 | 6 | 6 | 6 |
| Content of component having a number of added moles of oxyethylene groups of n in component (a) (% by mass) | | 9.2 | 9.2 | 9.2 | 9.2 | 9.2 | 9.2 | 9.2 | 9.2 | 9.2 |
| Content of component having a number of added moles of oxyethylene groups of n + 1 to n + 10 in component (a) (% by mass) | | 54.7 | 54.7 | 54.7 | 54.7 | 54.7 | 54.7 | 54.7 | 54.7 | 54.7 |
| Content of component having a number of added moles of oxyethylene groups of 0 in component (a) (% by mass) | | 2.9 | 2.9 | 2.9 | 2.9 | 2.9 | 2.9 | 2.9 | 2.9 | 2.9 |
| Content of component (a) in composition (% by mass) | | 34.9 | 47.4 | 45.1 | 42.4 | 39.9 | 37.3 | 34.9 | 27.4 | 25.1 |
| Content of component (b) in composition (% by mass) | | 13.0 | 5.0 | 10.0 | 15.0 | 20.0 | 25.3 | 30.1 | 45.1 | 49.9 |
| Content of component (c) in composition (% by mass) | | 52.1 | 47.6 | 44.9 | 42.6 | 40.1 | 37.4 | 35.0 | 27.5 | 25.0 |
| Mass ratio (a/(a + c)) | | 0.40 | 0.50 | 0.50 | 0.50 | 0.50 | 0.50 | 0.50 | 0.50 | 0.50 |
| Mass ratio b/a | | 0.372 | 0.105 | 0.222 | 0.354 | 0.501 | 0.678 | 0.862 | 1.65 | 1.99 |
| Evaluation results — Structural body formed by mixing of component (a) and component (c) *1 | | H + preH | H + preH | H + preH | H + preH | H + preH | H + preH | H + preH | H + preH | H + preH |
| Presence or absence of Fd-3m liquid crystal in composition | | Present | Present | Present | Present | Present | Present | Present | Present | Present |

*1) H = hexagonal structural body, preH = pre-hexagonal structural body, L = lamellar structural body, m = micelle structural body, and I = cubic structural body
These Examples were obtained by exhaustive mixing of (a-1) Emulgen 108, (b-1) triolein, and (c) deionized water
H represents the hexagonal phase, preH represents the pre-hexagonal structural body, L presents the lamellar phase, and m represents the micelle phase

TABLE 2

| | | | | Examples | | | | | |
|---|---|---|---|---|---|---|---|---|---|
| | | 21 | 22 | 23 | 24 | 25 | 26 | 27 | 28 | 29 | 30 |
| Compositional blending | (a) (a-1) Polyoxyethylene lauryl ether (g) | 2.24 | 2.00 | 1.75 | 1.49 | 0.99 | 3.24 | 2.99 | 1.24 | 3.62 | 3.44 |
| | (b) (b-1) Triolein (g) | 5.52 | 6.00 | 6.49 | 7.02 | 8.01 | 3.51 | 4.00 | 7.51 | 1.04 | 1.47 |
| | (c) Deionized water (g) | 2.24 | 2.00 | 1.76 | 1.49 | 1.00 | 3.25 | 3.01 | 1.25 | 5.34 | 5.09 |
| Average number of added moles of oxyethylene groups in component (a), n | | 6 | 6 | 6 | 6 | 6 | 6 | 6 | 6 | 6 | 6 |

TABLE 2-continued

|  |  | | | | | | | | | | |
|---|---|---|---|---|---|---|---|---|---|---|---|
| Content of component having a number of added moles of oxyethylene groups of n in component (a) (% by mass) | | 9.2 | 9.2 | 9.2 | 9.2 | 9.2 | 9.2 | 9.2 | 9.2 | 9.2 | 9.2 |
| Content of component having a number of added moles of oxyethylene groups of n + 1 to n + 10 in component (a) (% by mass) | | 54.7 | 54.7 | 54.7 | 54.7 | 54.7 | 54.7 | 54.7 | 54.7 | 54.7 | 54.7 |
| Content of component having a number of added moles of oxyethylene groups of 0 in component (a) (% by mass) | | 2.9 | 2.9 | 2.9 | 2.9 | 2.9 | 2.9 | 2.9 | 2.9 | 2.9 | 2.9 |
| Content of component (a) in composition (% by mass) | | 22.4 | 20.0 | 17.5 | 14.9 | 9.9 | 32.4 | 29.9 | 12.4 | 36.2 | 34.4 |
| Content of component (b) in composition (% by mass) | | 55.2 | 60.0 | 64.9 | 70.2 | 80.1 | 35.1 | 40.0 | 75.1 | 10.4 | 14.7 |
| Content of component (c) in composition (% by mass) | | 22.4 | 20.0 | 17.6 | 14.9 | 10.0 | 32.5 | 30.1 | 12.5 | 53.4 | 50.9 |
| Mass ratio (a/(a + c)) | | 0.50 | 0.50 | 0.50 | 0.50 | 0.50 | 0.50 | 0.50 | 0.50 | 0.40 | 0.40 |
| Mass ratio b/a | | 2.46 | 3.00 | 3.71 | 4.71 | 8.09 | 1.08 | 1.34 | 6.06 | 0.287 | 0.427 |
| Evaluation results | Structural body formed by mixing of component (a) and component (c) *1 | H + preH | H + preH | H + preH | H + preH | H + preH | H + preH | H + preH | H + preH | H + preH | H + preH |
| | Presence or absence of Fd-3m liquid crystal in composition | Present | Present | Present | Present | Present | Present | Present | Present | Present | Present |

|  |  |  | Examples | | | | | | | |
|---|---|---|---|---|---|---|---|---|---|---|
|  |  |  | 31 | 32 | 33 | 34 | 35 | 36 | 37 | 38 |
| Compositional blending | (a) | (a-1) Polyoxyethylene lauryl ether (g) | 3.19 | 3.02 | 2.79 | 2.58 | 2.40 | 2.18 | 2.00 | 1.82 |
|  | (b) | (b-1) Triolein (g) | 2.01 | 2.48 | 3.04 | 3.53 | 4.02 | 4.52 | 5.00 | 5.48 |
|  | (c) | Deionized water (g) | 4.80 | 4.50 | 4.17 | 3.89 | 3.58 | 3.30 | 3.00 | 2.70 |
| Average number of added moles of oxyethylene groups in component (a), n | | | 6 | 6 | 6 | 6 | 6 | 6 | 6 | 6 |
| Content of component having a number of added moles of oxyethylene groups of n in component (a) (% by mass) | | | 9.2 | 9.2 | 9.2 | 9.2 | 9.2 | 9.2 | 9.2 | 9.2 |
| Content of component having a number of added moles of oxyethylene groups of n + 1 to n + 10 in component (a) (% by mass) | | | 54.7 | 54.7 | 54.7 | 54.7 | 54.7 | 54.7 | 54.7 | 54.7 |
| Content of component having a number of added moles of oxyethylene groups of 0 in component (a) (% by mass) | | | 2.9 | 2.9 | 2.9 | 2.9 | 2.9 | 2.9 | 2.9 | 2.9 |
| Content of component (a) in composition (% by mass) | | | 31.9 | 30.2 | 27.9 | 25.8 | 24.0 | 21.8 | 20.0 | 18.2 |
| Content of component (b) in composition (% by mass) | | | 20.1 | 24.8 | 30.4 | 35.3 | 40.2 | 45.2 | 50.0 | 54.8 |
| Content of component (c) in composition (% by mass) | | | 48.0 | 45.0 | 41.7 | 38.9 | 35.8 | 33.0 | 30.0 | 27.0 |
| Mass ratio (a/(a + c)) | | | 0.40 | 0.40 | 0.40 | 0.40 | 0.40 | 0.40 | 0.40 | 0.40 |
| Mass ratio b/a | | | 0.630 | 0.821 | 1.09 | 1.37 | 1.68 | 2.07 | 2.50 | 3.01 |
| Evaluation results | Structural body formed by mixing of component (a) and component (c) *1 | | H + preH | H + preH | H + preH | H + preH | H + preH | H + preH | H + preH | H + preH |
| | Presence or absence of Fd-3m liquid crystal in composition | | Present | Present | Present | Present | Present | Present | Present | Present |

|  |  |  | Examples | | | | | | |
|---|---|---|---|---|---|---|---|---|---|
|  |  |  | 39 | 40 | 41 | 42 | 43 | 44 | 45 |
| Compositional blending | (a) | (a-1) Polyoxyethylene lauryl ether (g) | 1.61 | 1.42 | 1.19 | 3.28 | 3.69 | 4.10 | 4.51 |
|  | (b) | (b-1) Triolein (g) | 5.99 | 6.49 | 7.02 | 0.72 | 0.81 | 0.89 | 0.99 |
|  | (c) | Deionized water (g) | 2.40 | 2.09 | 1.79 | 6.00 | 5.50 | 5.01 | 4.50 |
| Average number of added moles of oxyethylene groups in component (a), n | | | 6 | 6 | 6 | 6 | 6 | 6 | 6 |

TABLE 2-continued

|  | | | | | | | |
|---|---|---|---|---|---|---|---|
| Content of component having a number of added moles of oxyethylene groups of n in component (a) (% by mass) | 9.2 | 9.2 | 9.2 | 9.2 | 9.2 | 9.2 | 9.2 |
| Content of component having a number of added moles of oxyethylene groups of n + 1 to n + 10 in component (a) (% by mass) | 54.7 | 54.7 | 54.7 | 54.7 | 54.7 | 54.7 | 54.7 |
| Content of component having a number of added moles of oxyethylene groups of 0 in component (a) (% by mass) | 2.9 | 2.9 | 2.9 | 2.9 | 2.9 | 2.9 | 2.9 |
| Content of component (a) in composition (% by mass) | 16.1 | 14.2 | 11.9 | 32.8 | 36.9 | 41.0 | 45.1 |
| Content of component (b) in composition (% by mass) | 59.9 | 64.9 | 70.2 | 7.2 | 8.1 | 8.9 | 9.9 |
| Content of component (c) in composition (% by mass) | 24.0 | 20.9 | 17.9 | 60.0 | 55.0 | 50.1 | 45.0 |
| Mass ratio (a/(a + c)) | 0.40 | 0.40 | 0.40 | 0.35 | 0.40 | 0.45 | 0.50 |
| Mass ratio b/a | 3.72 | 4.57 | 5.90 | 0.220 | 0.220 | 0.217 | 0.220 |
| Evaluation results — Structural body formed by mixing of component (a) and component (c) *1 | H + preH | H + preH | H + preH | H + preH | H + preH | H + preH | H + preH |
| Presence or absence of Fd-3m liquid crystal in composition | Present | Present | Present | Present | Present | Present | Present |

*1) H = hexagonal structural body, preH = pre-hexagonal structural body, L = lamellar structural body, m = micelle structural body, and I = cubic structural body

TABLE 3

| | | | Comparative Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Compositional blending | (a) | (a-1) Polyoxyethylene lauryl ether (g) | 4.91 | 5.99 | 3.76 | 4.00 | 4.25 | 7.50 | 7.14 | 6.75 | 5.99 | 5.26 | 4.49 |
| | (b) | (b-1) Triolein (g) | 1.08 | 0.00 | 3.75 | 4.00 | 4.25 | 0.00 | 0.48 | 1.00 | 2.02 | 2.99 | 4.02 |
| | (c) | Deionized water (g) | 4.01 | 4.01 | 2.49 | 2.00 | 1.50 | 2.50 | 2.38 | 2.25 | 1.99 | 1.75 | 1.49 |
| Average number of added moles of oxyethylene groups in component (a), n | | | 6 | 6 | 6 | 6 | 6 | 6 | 6 | 6 | 6 | 6 | 6 |
| Content of component having a number of added moles of oxyethylene groups of n in component (a) (% by mass) | | | 9.2 | 9.2 | 9.2 | 9.2 | 9.2 | 9.2 | 9.2 | 9.2 | 9.2 | 9.2 | 9.2 |
| Content of component having a number of added moles of oxyethylene groups of n + 1 to n + 10 in component (a) (% by mass) | | | 54.7 | 54.7 | 54.7 | 54.7 | 54.7 | 54.7 | 54.7 | 54.7 | 54.7 | 54.7 | 54.7 |
| Content of component having a number of added moles of oxyethylene groups of 0 in component (a) (% by mass) | | | 2.9 | 2.9 | 2.9 | 2.9 | 2.9 | 2.9 | 2.9 | 2.9 | 2.9 | 2.9 | 2.9 |
| Content of component (a) in composition (% by mass) | | | 49.1 | 59.9 | 37.6 | 40.0 | 42.5 | 75.0 | 71.4 | 67.5 | 59.9 | 52.6 | 44.9 |
| Content of component (b) in composition (% by mass) | | | 10.8 | 0.0 | 37.5 | 40.0 | 42.5 | 0.0 | 4.8 | 10.0 | 20.2 | 29.9 | 40.2 |
| Content of component (c) in composition (% by mass) | | | 40.1 | 40.1 | 24.9 | 20.0 | 15.0 | 25.0 | 23.8 | 22.5 | 19.9 | 17.5 | 14.9 |
| Mass ratio (a/(a + c)) | | | 0.55 | 0.60 | 0.60 | 0.67 | 0.74 | 0.75 | 0.75 | 0.75 | 0.75 | 0.75 | 0.75 |
| Mass ratio b/a | | | 0.22 | 0.00 | 1.00 | 1.00 | 1.00 | 0.00 | 0.07 | 0.15 | 0.34 | 0.57 | 0.90 |
| Evaluation results | Structural body formed by mixing of component (a) and component (c) *1 | | L | L | L | L | L | L | L | L | L | L | L |
| | Presence or absence of Fd-3m liquid crystal in composition | | Absent | Absent | Absent | Absent | Absent | Absent | Absent | Absent | Absent | Absent | Absent |

TABLE 3-continued

| | | | Comparative Examples | | | | | | | | |
|---|---|---|---|---|---|---|---|---|---|---|---|
| | | | 12 | 13 | 14 | 15 | 16 | 17 | 18 | 19 | 20 |
| Compositional blending | (a) | (a-1) Polyoxy-ethylene lauryl ether (g) | 3.76 | 3.01 | 1.50 | 0.73 | 6.08 | 5.22 | 4.89 | 3.92 | 3.79 |
| | (b) | (b-1) Triolein (g) | 4.99 | 5.99 | 8.00 | 8.78 | 1.31 | 1.31 | 0.21 | 0.27 | 0.50 |
| | (c) | Deionized water (g) | 1.25 | 1.00 | 0.50 | 0.49 | 2.61 | 3.47 | 4.90 | 5.81 | 5.71 |
| Average number of added moles of oxyethylene groups in component (a), n | | | 6 | 6 | 6 | 6 | 6 | 6 | 6 | 6 | 6 |
| Content of component having a number of added moles of oxyethylene groups of n in component (a) (% by mass) | | | 9.2 | 9.2 | 9.2 | 9.2 | 9.2 | 9.2 | 9.2 | 9.2 | 9.2 |
| Content of component having a number of added moles of oxyethylene groups of n + 1 to n + 10 in component (a) (% by mass) | | | 54.7 | 54.7 | 54.7 | 54.7 | 54.7 | 54.7 | 54.7 | 54.7 | 54.7 |
| Content of component having a number of added moles of oxyethylene groups of 0 in component (a) (% by mass) | | | 2.9 | 2.9 | 2.9 | 2.9 | 2.9 | 2.9 | 2.9 | 2.9 | 2.9 |
| Content of component (a) in composition (% by mass) | | | 37.6 | 30.1 | 15.0 | 7.3 | 60.8 | 52.2 | 48.9 | 39.2 | 37.9 |
| Content of component (b) in composition (% by mass) | | | 49.9 | 59.9 | 80.0 | 87.8 | 13.1 | 13.1 | 2.1 | 2.7 | 5.0 |
| Content of component (c) in composition (% by mass) | | | 12.5 | 10.0 | 5.0 | 4.9 | 26.1 | 34.7 | 49.0 | 58.1 | 57.1 |
| Mass ratio (a/(a + c)) | | | 0.75 | 0.75 | 0.75 | 0.60 | 0.70 | 0.60 | 0.50 | 0.40 | 0.40 |
| Mass ratio b/a | | | 1.33 | 1.99 | 5.33 | 12.03 | 0.22 | 0.25 | 0.04 | 0.07 | 0.13 |
| Evaluation results | | Structural body formed by mixing of component (a) and component (c) *1 | L | L | L | L | L | L | L | L | L |
| | | Presence or absence of Fd-3m liquid crystal in composition | Absent | Absent | Absent | Absent | Absent | Absent | Absent | Absent | Absent |

*1) H = hexagonal structural body, preH = pre-hexagonal structural body, L = lamellar structural body, m = micelle structural body, and I = cubic structural body

TABLE 4

| | | | Comparative Examples | | | | | | | | | | | |
|---|---|---|---|---|---|---|---|---|---|---|---|---|---|---|
| | | | 21 | 22 | 23 | 24 | 25 | 26 | 27 | 28 | 29 | 30 | 31 |
| Compositional blending | (a) | (a-1) Polyoxy-ethylene lauryl ether (g) | 4.93 | 0.32 | 0.69 | 1.10 | 1.51 | 2.02 | 1.23 | 0.50 | 1.00 | 1.50 | 2.00 |
| | (b) | (b-1) Triolein (g) | 1.08 | 5.67 | 5.31 | 4.91 | 4.48 | 3.97 | 4.78 | 0.50 | 1.00 | 1.50 | 2.00 |
| | (c) | Deionized water (g) | 3.99 | 4.01 | 4.00 | 3.99 | 4.01 | 4.01 | 3.99 | 9.00 | 8.00 | 7.00 | 6.00 |
| Average number of added moles of oxyethylene groups in component (a), n | | | 6 | 6 | 6 | 6 | 6 | 6 | 6 | 6 | 6 | 6 | 6 |
| Content of component having a number of added moles of oxyethylene groups of n in component (a) (% by mass) | | | 9.2 | 9.2 | 9.2 | 9.2 | 9.2 | 9.2 | 9.2 | 9.2 | 9.2 | 9.2 | 9.2 |
| Content of component having a number of added moles of oxyethylene groups of n + 1 to n + 10 in component (a) (% by mass) | | | 54.7 | 54.7 | 54.7 | 54.7 | 54.7 | 54.7 | 54.7 | 54.7 | 54.7 | 54.7 | 54.7 |
| Content of component having a number of added moles of oxyethylene groups of 0 in component (a) (% by mass) | | | 2.9 | 2.9 | 2.9 | 2.9 | 2.9 | 2.9 | 2.9 | 2.9 | 2.9 | 2.9 | 2.9 |
| Content of component (a) in composition (% by mass) | | | 49.3 | 3.2 | 6.9 | 11.0 | 15.1 | 20.2 | 12.3 | 5.0 | 10.0 | 15.0 | 20.0 |
| Content of component (b) in composition (% by mass) | | | 10.8 | 56.7 | 53.1 | 49.1 | 44.8 | 39.7 | 47.8 | 5.0 | 10.0 | 15.0 | 20.0 |
| Content of component (c) in composition (% by mass) | | | 39.9 | 40.1 | 40.0 | 39.9 | 40.1 | 40.1 | 39.9 | 90.0 | 80.0 | 70.0 | 60.0 |

TABLE 4-continued

| | | | | | | | | | | | | |
|---|---|---|---|---|---|---|---|---|---|---|---|---|
| Mass ratio (a/(a + c)) | | 0.55 | 0.07 | 0.15 | 0.22 | 0.27 | 0.33 | 0.24 | 0.05 | 0.11 | 0.18 | 0.25 |
| Mass ratio b/a | | 0.22 | 17.72 | 7.70 | 4.46 | 2.97 | 1.97 | 3.89 | 1.00 | 1.00 | 1.00 | 1.00 |
| Evaluation results | Structural body formed by mixing of component (a) and component (c) *1 | L | m | m | m | m | m | m | m | m | m | m |
| | Presence or absence of Fd-3m liquid crystal in composition | Absent | Absent | Absent | Absent | Absent | Absent | Absent | Absent | Absent | Absent | Absent |

| | | | | Comparative Examples | | | | | | | | |
|---|---|---|---|---|---|---|---|---|---|---|---|---|
| | | | | 32 | 33 | 34 | 35 | 36 | 37 | 38 | 39 | 40 |
| Compositional blending | (a) | (a-1) Polyoxyethylene lauryl ether (g) | | 2.25 | 2.33 | 2.38 | 2.44 | 2.49 | 2.51 | 2.61 | 2.46 | 2.87 |
| | (b) | (b-1) Triolein (g) | | 2.26 | 2.33 | 2.39 | 2.45 | 2.50 | 2.51 | 1.36 | 0.54 | 0.62 |
| | (c) | Deionized water (g) | | 5.49 | 5.34 | 5.23 | 5.11 | 5.01 | 4.98 | 6.03 | 7.00 | 6.51 |
| Average number of added moles of oxyethylene groups in component (a), n | | | | 6 | 6 | 6 | 6 | 6 | 6 | 6 | 6 | 6 |
| Content of component having a number of added moles of oxyethylene groups of n in component (a) (% by mass) | | | | 9.2 | 9.2 | 9.2 | 9.2 | 9.2 | 9.2 | 9.2 | 9.2 | 9.2 |
| Content of component having a number of added moles of oxyethylene groups of n + 1 to n + 10 in component (a) (% by mass) | | | | 54.7 | 54.7 | 54.7 | 54.7 | 54.7 | 54.7 | 54.7 | 54.7 | 54.7 |
| Content of component having a number of added moles of oxyethylene groups of 0 in component (a) (% by mass) | | | | 2.9 | 2.9 | 2.9 | 2.9 | 2.9 | 2.9 | 2.9 | 2.9 | 2.9 |
| Content of component (a) in composition (% by mass) | | | | 22.5 | 23.3 | 23.8 | 24.4 | 24.9 | 25.1 | 26.1 | 24.6 | 28.7 |
| Content of component (b) in composition (% by mass) | | | | 22.6 | 23.3 | 23.9 | 24.5 | 25.0 | 25.1 | 13.6 | 5.4 | 6.2 |
| Content of component (c) in composition (% by mass) | | | | 54.9 | 53.4 | 52.3 | 51.1 | 50.1 | 49.8 | 60.3 | 70.0 | 65.1 |
| Mass ratio (a/(a + c)) | | | | 0.29 | 0.30 | 0.31 | 0.32 | 0.33 | 0.34 | 0.30 | 0.26 | 0.31 |
| Mass ratio b/a | | | | 1.00 | 1.00 | 1.00 | 1.00 | 1.00 | 1.00 | 0.52 | 0.22 | 0.22 |
| Evaluation results | Structural body formed by mixing of component (a) and component (c) *1 | | | m | m | m | m | m | m | m | m | m |
| | Presence or absence of Fd-3m liquid crystal in composition | | | Absent | Absent | Absent | Absent | Absent | Absent | Absent | Absent | Absent |

*1) H = hexagonal structural body, preH = pre-hexagonal structural body, L = lamellar structural body, m = micelle structural body, and I = cubic structural body

TABLE 5

| | | | | Examples | | | | | | | | | Comparative Examples | |
|---|---|---|---|---|---|---|---|---|---|---|---|---|---|---|
| | | | | 46 | 47 | 48 | 49 | 50 | 51 | 52 | 53 | 54 | 41 | 42 |
| Compositional blending | (a) | (a-1) Polyoxyethylene lauryl ether (g) | | 0 | 0 | 1.00 | 1.33 | 1.67 | 2.00 | 2.33 | 2.67 | 3.00 | 0.33 | 0.67 |
| | | (a-2) Polyoxyethylene lauryl ether (g) | | 2.23 | 1.37 | 2.33 | 2.00 | 1.67 | 1.33 | 1.00 | 0.67 | 0.33 | 3.00 | 2.67 |
| | (b) | (b-1) Triolein (g) | | 5.55 | 7.25 | 3.33 | 3.33 | 3.33 | 3.33 | 3.33 | 3.33 | 3.33 | 3.33 | 3.33 |
| | (c) | Deionized water (g) | | 2.22 | 1.38 | 3.33 | 3.33 | 3.33 | 3.33 | 3.33 | 3.33 | 3.33 | 3.33 | 3.33 |
| Average number of added moles of oxyethylene groups in component (a), n | | | | 6 | 6 | 6 | 6 | 6 | 6 | 6 | 6 | 6 | 6 | 6 |

TABLE 5-continued

|  | Examples | | | | | | | | | Comparative Examples | |
|---|---|---|---|---|---|---|---|---|---|---|---|
|  | 46 | 47 | 48 | 49 | 50 | 51 | 52 | 53 | 54 | 41 | 42 |
| Content of component having a number of added moles of oxyethylene groups of n in component (a) (% by mass) | 100 | 100 | 72.8 | 63.7 | 54.6 | 45.5 | 36.4 | 27.3 | 18.3 | 90.9 | 81.8 |
| Content of component having a number of added moles of oxyethylene groups of n + 1 to n + 10 in component (a) (% by mass) | 0 | 0 | 16.4 | 21.9 | 27.4 | 32.8 | 38.3 | 43.8 | 49.3 | 5.5 | 10.9 |
| Content of component having a number of added moles of oxyethylene groups of 0 in component (a) (% by mass) | 0 | 0 | 0.9 | 1.1 | 1.4 | 1.7 | 2 | 2.3 | 2.6 | 0.3 | 0.6 |
| Content of component (a) in composition (% by mass) | 22.3 | 13.7 | 33.3 | 33.3 | 33.4 | 33.3 | 33.3 | 33.4 | 33.3 | 33.3 | 33.4 |
| Content of component (b) in composition (% by mass) | 55.5 | 72.5 | 33.3 | 33.3 | 33.3 | 33.3 | 33.3 | 33.3 | 33.3 | 33.3 | 33.3 |
| Content of component (c) in composition (% by mass) | 22.2 | 13.8 | 33.3 | 33.3 | 33.3 | 33.3 | 33.3 | 33.3 | 33.3 | 33.3 | 33.3 |
| Mass ratio (a/(a + c)) | 0.50 | 0.50 | 0.50 | 0.50 | 0.50 | 0.50 | 0.50 | 0.50 | 0.50 | 0.50 | 0.50 |
| Mass ratio b/a | 2.49 | 5.29 | 1.00 | 1.00 | 1.00 | 1.00 | 1.00 | 1.00 | 1.00 | 1.00 | 1.00 |
| Evaluation results — Structural body formed by mixing of component (a) and component (c) *1 | H | H | H + preH | H + preH | H + preH | H + preH | H + preH | H + preH | H + preH | H | H |
| Evaluation results — Presence or absence of Fd-3m liquid crystal in composition | Present | Present | Present | Present | Present | Present | Present | Present | Present | Absent | Absent |

*1) H = hexagonal structural body, preH = pre-hexagonal structural body, L = lamellar structural body, m = micelle structural body, and I = cubic structural body

TABLE 6

|  |  |  | Examples | | | | | | | |
|---|---|---|---|---|---|---|---|---|---|---|
|  |  |  | 55 | 56 | 57 | 58 | 59 | 60 | 61 | 62 |
| Compositional blending | (a) | (a-3) Polyoxyethylene lauryl ether (g) | 1.51 | 1.81 | 2.06 | 2.27 | 2.45 | 2.6 | 2.74 | 2.85 |
|  |  | (a-4) Polyoxyethylene lauryl ether (g) | 1.82 | 1.52 | 1.27 | 1.06 | 0.88 | 0.73 | 0.6 | 0.48 |
|  | (b) | (b-1) Triolein (g) | 3.33 | 3.33 | 3.33 | 3.33 | 3.33 | 3.33 | 3.33 | 3.33 |
|  | (c) | Deionized water (g) | 3.33 | 3.33 | 3.33 | 3.33 | 3.33 | 3.33 | 3.33 | 3.33 |
| Average number of added moles of oxyethylene groups in component (a), n | | | 5 | 6 | 7 | 8 | 9 | 10 | 11 | 12 |
| Content of component having a number of added moles of oxyethylene groups of n in component (a) (% by mass) | | | 3.7 | 2.2 | 1.6 | 1.3 | 1.2 | 1.4 | 1.8 | 2.4 |
| Content of component having a number of added moles of oxyethylene groups of n + 1 to n + 10 in component (a) (% by mass) | | | 18.1 | 19.7 | 23.4 | 28.5 | 34.4 | 40.5 | 46.4 | 51.4 |
| Content of component having a number of added moles of oxyethylene groups of 0 in component (a) (% by mass) | | | 12.3 | 10.3 | 8.6 | 7.2 | 6.0 | 5.0 | 4.1 | 3.3 |
| Content of component (a) in composition (% by mass) | | | 33.3 | 33.3 | 33.3 | 33.3 | 33.3 | 33.3 | 33.4 | 33.3 |
| Content of component (b) in composition (% by mass) | | | 33.3 | 33.3 | 33.3 | 33.3 | 33.3 | 33.3 | 33.3 | 33.3 |
| Content of component (c) in composition (% by mass) | | | 33.3 | 33.3 | 33.3 | 33.3 | 33.3 | 33.3 | 33.3 | 33.3 |
| Mass ratio (a/(a + c)) | | | 0.50 | 0.50 | 0.50 | 0.50 | 0.50 | 0.50 | 0.50 | 0.50 |
| Mass ratio b/a | | | 1.00 | 1.00 | 1.00 | 1.00 | 1.00 | 1.00 | 1.00 | 1.00 |
| Evaluation results — Structural body formed by mixing of component (a) and component (c) *1 | | | H + preH + L | H + preH + L | H + preH + L | H + preH + L | H + preH + L | H + preH | H + preH | H + preH |

TABLE 6-continued

| | | | | | | | | |
|---|---|---|---|---|---|---|---|---|
| Presence or absence of Fd-3m liquid crystal in composition | Present | Present | Present | Present | Present | Present | Present | Present |

| | | | Examples | | | | | | |
|---|---|---|---|---|---|---|---|---|---|
| | | | 63 | 64 | 65 | 66 | 67 | 68 | 69 |
| Compositional blending | (a) | (a-3) Polyoxyethylene lauryl ether (g) | 2.95 | 3.05 | 3.13 | 3.2 | 3.27 | 9.99 | 3.33 |
| | | (a-4) Polyoxyethylene lauryl ether (g) | 0.38 | 0.29 | 0.21 | 0.13 | 0.07 | 0.01 | 0 |
| | (b) | (b-1) Triolein (g) | 3.33 | 3.33 | 3.33 | 3.33 | 3.33 | 10 | 3.33 |
| | (c) | Deionized water (g) | 3.33 | 3.33 | 3.33 | 3.33 | 3.33 | 10 | 3.33 |
| Average number of added moles of oxyethylene groups in component (a), n | | | 13 | 14 | 15 | 16 | 17 | 18 | 19 |
| Content of component having a number of added moles of oxyethylene groups of n in component (a) (% by mass) | | | 3.1 | 3.9 | 4.8 | 5.6 | 6.4 | 6.9 | 7.2 |
| Content of component having a number of added moles of oxyethylene groups of n + 1 to n + 10 in component (a) (% by mass) | | | 55.3 | 57.8 | 58.7 | 57.9 | 55.8 | 52.2 | 46.8 |
| Content of component having a number of added moles of oxyethylene groups of 0 in component (a) (% by mass) | | | 2.6 | 2.0 | 1.4 | 0.9 | 0.5 | 0.1 | 0.1 |
| Content of component (a) in composition (% by mass) | | | 33.3 | 33.4 | 33.4 | 33.3 | 33.4 | 33.3 | 33.3 |
| Content of component (b) in composition (% by mass) | | | 33.3 | 33.3 | 33.3 | 33.3 | 33.3 | 33.3 | 33.3 |
| Content of component (c) in composition (% by mass) | | | 33.3 | 33.3 | 33.3 | 33.3 | 33.3 | 33.3 | 33.3 |
| Mass ratio (a/(a + c)) | | | 0.50 | 0.50 | 0.50 | 0.50 | 0.50 | 0.50 | 0.50 |
| Mass ratio b/a | | | 1.00 | 1.00 | 1.00 | 1.00 | 1.00 | 1.00 | 1.00 |
| Evaluation results | Structural body formed by mixing of component (a) and component (c) *1 | | H + preH + I | H + preH + I | preH + I | preH + I | preH + I | preH + I | preH + I |
| | Presence or absence of Fd-3m liquid crystal in composition | | Present | Present | Present | Present | Present | Present | Present |

*1) H = hexagonal structural body, preH = pre-hexagonal structural body, L = lamellar structural body, m = micelle structural body, and I = cubic structural body

TABLE 7

| | | | Examples | | | | | | | | | | |
|---|---|---|---|---|---|---|---|---|---|---|---|---|---|
| | | | 70 | 71 | 72 | 73 | 74 | 75 | 76 | 77 | 78 | 79 | 80 |
| Compositional blending | (a) | (a-1) Polyoxyethylene lauryl ether (g) | | | | | 3.33 | | | | | 3.33 | |
| | | (a-5) Polyoxyethylene sorbitan monooleate (g) | 3.33 | 4.35 | 4.35 | 4.35 | | 3.33 | | | | | |
| | | (a-6) Sucrose laurate (g) | | | | | | | 3.75 | 3.75 | 3.75 | | 3.75 |
| | (b) | (b-1) Triolein (g) | 3.33 | | | | | | | | | | |
| | | (b-2) Tristearin (g) | | 1.3 | | | | | | | | | |
| | | (b-3) Tripalmitin (g) | | | 1.3 | | | | | | | | |
| | | (b-4) Trilaurin (g) | | | | 1.3 | | | | | | | |
| | | (b-5) Squalene (g) | | | | | 3.33 | 3.33 | 3.75 | | | | |
| | | (b-6) Squalane (g) | | | | | | | | 3.75 | | | |

TABLE 7-continued

| | | | | | | | | | | | | |
|---|---|---|---|---|---|---|---|---|---|---|---|---|
| | (b-7) Octane (g) | | | | | | | | 3.75 | | | |
| | (b-8) Decane (g) | | | | | | | | | | 3.33 | 3.75 |
| | (b-9) Undecane (g) | | | | | | | | | | | |
| | (b-10) Dodecane (g) | | | | | | | | | | | |
| | (b-11) Tridecane (g) | | | | | | | | | | | |
| | (b-12) Tetradecane (g) | | | | | | | | | | | |
| | (b-13) Hexadecane (g) | | | | | | | | | | | |
| | (c) Deionized water (g) | 3.33 | 4.35 | 4.35 | 4.35 | 3.33 | 3.33 | 2.50 | 2.50 | 2.50 | 3.33 | 2.50 |
| Content of component (a) in composition (% by mass) | | 33.3 | 43.5 | 43.5 | 43.5 | 33.3 | 33.3 | 37.5 | 37.5 | 37.5 | 33.3 | 37.5 |
| Content of component (b) in composition (% by mass) | | 33.3 | 13.0 | 13.0 | 13.0 | 33.3 | 33.3 | 37.5 | 37.5 | 37.5 | 33.3 | 37.5 |
| Content of component (c) in composition (% by mass) | | 33.3 | 43.5 | 43.5 | 43.5 | 33.3 | 33.3 | 25.0 | 25.0 | 25.0 | 33.3 | 25.0 |
| Mass ratio (a/(a + c)) | | 0.50 | 0.50 | 0.50 | 0.50 | 0.50 | 0.50 | 0.60 | 0.60 | 0.60 | 0.50 | 0.60 |
| Mass ratio b/a | | 1.00 | 0.30 | 0.30 | 0.30 | 1.00 | 1.00 | 1.00 | 1.00 | 1.00 | 1.00 | 1.00 |
| Evaluation results | Structural body formed by mixing of component (a) and component (c) *1 | H + preH | H + preH | H + preH | H + preH | H + preH | H + preH | H + preH | H + preH | H + preH | H + preH | H + preH |
| | Presence or absence of Fd-3m liquid crystal in composition | Present | Present | Present | Present | Present | Present | Present | Present | Present | Present | Present |

| | | | Examples | | | | | | | | | |
|---|---|---|---|---|---|---|---|---|---|---|---|---|
| | | | 81 | 82 | 83 | 84 | 85 | 86 | 87 | 88 | 89 | 90 |
| Compositional blending | (a) | (a-1) Polyoxyethylene lauryl ether (g) | 3.33 | | 3.33 | | 3.33 | | 3.33 | | 3.33 | |
| | | (a-5) Polyoxyethylene sorbitan monooleate (g) | | | | | | | | | | |
| | | (a-6) Sucrose laurate (g) | | 3.75 | | 3.75 | | 3.75 | | 3.75 | | 3.75 |
| | (b) | (b-1) Triolein (g) | | | | | | | | | | |
| | | (b-2) Tristearin (g) | | | | | | | | | | |
| | | (b-3) Tripalmitin (g) | | | | | | | | | | |
| | | (b-4) Trilaurin (g) | | | | | | | | | | |
| | | (b-5) Squalene (g) | | | | | | | | | | |
| | | (b-6) Squalane (g) | | | | | | | | | | |
| | | (b-7) Octane (g) | | | | | | | | | | |
| | | (b-8) Decane (g) | | | | | | | | | | |
| | | (b-9) Undecane (g) | 3.33 | 3.75 | | | | | | | | |
| | | (b-10) Dodecane (g) | | | 3.33 | 3.75 | | | | | | |
| | | (b-11) Tridecane (g) | | | | | 3.33 | 3.75 | | | | |
| | | (b-12) Tetradecane (g) | | | | | | | 3.33 | 3.75 | | |
| | | (b-13) Hexadecane (g) | | | | | | | | | 3.33 | 3.75 |
| | (c) | Deionized water (g) | 3.33 | 2.50 | 3.33 | 2.50 | 3.33 | 2.50 | 3.33 | 2.50 | 3.33 | 2.50 |
| Content of component (a) in composition (% by mass) | | | 33.3 | 37.5 | 33.3 | 37.5 | 33.3 | 37.5 | 33.3 | 37.5 | 33.3 | 37.5 |
| Content of component (b) in composition (% by mass) | | | 33.3 | 37.5 | 33.3 | 37.5 | 33.3 | 37.5 | 33.3 | 37.5 | 33.3 | 37.5 |
| Content of component (c) in composition (% by mass) | | | 33.3 | 25.0 | 33.3 | 25.0 | 33.3 | 25.0 | 33.3 | 25.0 | 33.3 | 25.0 |
| Mass ratio (a/(a + c)) | | | 0.50 | 0.60 | 0.50 | 0.60 | 0.50 | 0.60 | 0.50 | 0.60 | 0.50 | 0.60 |
| Mass ratio b/a | | | 1.00 | 1.00 | 1.00 | 1.00 | 1.00 | 1.00 | 1.00 | 1.00 | 1.00 | 1.00 |
| Evaluation results | Structural body formed by mixing of component (a) and component (c) *1 | | H + preH | H + preH | H + preH | H + preH | H + preH | H + preH | H + preH | H + preH | H + preH | H + preH |
| | Presence or absence of Fd-3m liquid crystal in composition | | Present | Present | Present | Present | Present | Present | Present | Present | Present | Present |

*1) H = hexagonal structural body, preH = pre-hexagonal structural body, L = lamellar structural body, m = micelle structural body, and I = cubic structural body

TABLE 8

| | | | Examples | | | | | | | | | | | |
|---|---|---|---|---|---|---|---|---|---|---|---|---|---|---|
| | | | 91 | 92 | 93 | 94 | 95 | 96 | 97 | 98 | 99 | 100 | 101 |
| Compositional blending | (a) | (a-1) Polyoxyethylene lauryl ether (g) | 3.33 | | | | | | 3.33 | | | | |
| | | (a-5) Polyoxyethylene sorbitan monooleate (g) | | | | | | | | | 3.33 | | 3.33 |
| | | (a-6) Sucrose laurate (g) | | 3.75 | 3.75 | 3.75 | 3.75 | 3.75 | | 3.75 | | 3.75 | |
| | (b) | (b-1) Triolein (g) | | | | | | | | | | | |
| | | (b-14) Octadecane (g) | 3.33 | 3.75 | | | | | | | | | |
| | | (b-15) Isododecane (g) | | | 3.75 | | | | | | | | |
| | | (b-16) Isopropyl myristate (g) | | | | 3.75 | | | | | | | |
| | | (b-17) Isopropyl palmitate (g) | | | | | 3.75 | | | | | | |
| | | (b-18) Cetyl 2-ethylhexanoate (g) | | | | | | 3.75 | | | | | |
| | | (b-19) 2-Octyldodecyl myristate (g) | | | | | | | 3.33 | 3.33 | 3.75 | | |
| | | (b-20) 2-Ethylhexyl stearate (g) | | | | | | | | | | 3.33 | 3.75 |
| | | (b-21) Triglyceride 2-ethylhexanoate (g) | | | | | | | | | | | |
| | | (b-22) Triisodecyl trimellitate (g) | | | | | | | | | | | |
| | | (b-23) Diisononyl phthalate (g) | | | | | | | | | | | |
| | | (b-24) Diisobutyl adipate (g) | | | | | | | | | | | |
| | (b') | (b'-1) Oleyl alcohol (g) | | | | | | | | | | | |
| | | (b'-2) Oleic acid (g) | | | | | | | | | | | |
| | (c) | Deionized water (g) | 3.33 | 2.50 | 2.50 | 2.50 | 2.50 | 2.50 | 3.33 | 3.33 | 2.50 | 3.33 | 2.50 |
| | Content of component (a) in composition (% by mass) | | 33.3 | 37.5 | 37.5 | 37.5 | 37.5 | 37.5 | 33.3 | 33.3 | 37.5 | 33.3 | 37.5 |
| | Content of component (b) in composition (% by mass) | | 33.3 | 37.5 | 37.5 | 37.5 | 37.5 | 37.5 | 33.3 | 33.3 | 37.5 | 33.3 | 37.5 |
| | Content of component (c) in composition (% by mass) | | 33.3 | 25.0 | 25.0 | 25.0 | 25.0 | 25.0 | 33.3 | 33.3 | 25.0 | 33.3 | 25.0 |
| | Mass ratio (a/(a + c)) | | 0.50 | 0.60 | 0.60 | 0.60 | 0.60 | 0.60 | 0.50 | 0.50 | 0.60 | 0.50 | 0.60 |
| | Mass ratio b/a | | 1.00 | 1.00 | 1.00 | 1.00 | 1.00 | 1.00 | 1.00 | 1.00 | 1.00 | 1.00 | 1.00 |
| | Mass ratio (b'/(b + b')) | | 0.00 | 0.00 | 0.00 | 0.00 | 0.00 | 0.00 | 0.00 | 0.00 | 0.00 | 0.00 | 0.00 |
| Evaluation results | Structural body formed by mixing of component (a) and component (c) *1 | | H + preH | H + preH | H + preH | H + preH | H + preH | H + preH | H + preH | H + preH | H + preH | H + preH | H + preH |
| | Presence or absence of Fd-3m liquid crystal in composition | | Present | Present | Present | Present | Present | Present | Present | Present | Present | Present | Present |

| | | | Examples | | | | | | Comparative Examples | | | |
|---|---|---|---|---|---|---|---|---|---|---|---|---|
| | | | 102 | 103 | 104 | 105 | 106 | 107 | 43 | 44 | 45 | 46 |
| Compositional blending | (a) | (a-1) Polyoxyethylene lauryl ether (g) | | | 3.33 | 3.33 | | | 3.33 | 3.33 | 3.33 | 2.76 |
| | | (a-5) Polyoxyethylene sorbitan monooleate (g) | 3.33 | | | | | | | | | |
| | | (a-6) Sucrose laurate (g) | | 3.75 | | | 3.75 | 3.75 | | | | |
| | (b) | (b-1) Triolein (g) | | | | | | | | | 1.00 | 1.38 |
| | | (b-14) Octadecane (g) | | | | | | | | | | |
| | | (b-15) Isododecane (g) | | | | | | | | | | |
| | | (b-16) Isopropyl myristate (g) | | | | | | | | | | |
| | | (b-17) Isopropyl palmitate (g) | | | | | | | | | | |
| | | (b-18) Cetyl 2-ethylhexanoate (g) | | | | | | | | | | |
| | | (b-19) 2-Octyldodecyl myristate (g) | | | | | | | | | | |
| | | (b-20) 2-Ethylhexyl stearate (g) | | | | | | | | | | |
| | | (b-21) Triglyceride 2-ethylhexanoate (g) | 3.33 | 3.75 | | | | | | | | |
| | | (b-22) Triisodecyl trimellitate (g) | | | 3.33 | | | | | | | |

TABLE 8-continued

| | | | | | | | | | | | | |
|---|---|---|---|---|---|---|---|---|---|---|---|---|
| | (b-23) Diisononyl phthalate (g) | | | | | 3.33 | 3.75 | | | | | |
| | (b-24) Diisobutyl adipate (g) | | | | | | | 3.75 | | | | |
| (b') | (b'-1) Oleyl alcohol (g) | | | | | | | | 3.33 | | 2.33 | 1.38 |
| | (b'-2) Oleic acid (g) | | | | | | | | | 3.33 | | |
| (c) | Deionized water (g) | 3.33 | 2.50 | 3.33 | 3.33 | 2.50 | 2.50 | 3.33 | 3.33 | 3.33 | 2.76 |
| | Content of component (a) in composition (% by mass) | 33.3 | 37.5 | 33.3 | 33.3 | 37.5 | 37.5 | 33.3 | 33.3 | 33.3 | 33.3 |
| | Content of component (b) in composition (% by mass) | 33.3 | 37.5 | 33.3 | 33.3 | 37.5 | 37.5 | 0 | 0 | 10.0 | 16.7 |
| | Content of component (c) in composition (% by mass) | 33.3 | 25.0 | 33.3 | 33.3 | 25.0 | 25.0 | 33.3 | 33.3 | 33.3 | 33.3 |
| | Mass ratio (a/(a + c)) | 0.50 | 0.60 | 0.50 | 0.50 | 0.60 | 0.60 | 0.50 | 0.50 | 0.50 | 0.50 |
| | Mass ratio b/a | 1.00 | 1.00 | 1.00 | 1.00 | 1.00 | 1.00 | 0.00 | 0.00 | 0.30 | 0.50 |
| | Mass ratio (b'/(b + b')) | 0.00 | 0.00 | 0.00 | 0.00 | 0.00 | 0.00 | 1.00 | 1.00 | 0.70 | 0.50 |
| Evaluation results | Structural body formed by mixing of component (a) and component (c) *1 | H + preH | H + preH | H + preH | H + preH | H + preH | H + preH | H + preH | H + preH | H + preH | H + preH |
| | Presence or absence of Fd-3m liquid crystal in composition | Present | Present | Present | Present | Present | Present | Absent | Absent | Absent | Absent |

*1) H = hexagonal structural body, preH = pre-hexagonal structural body, L = lamellar structural body, m = micelle structural body, and I = cubic structural body The components shown in Tables 1 to 8 are as follows. Note that the blending amounts described in the tables are the blending amounts (g) of the active ingredients.

<Surfactant (a)>
- (a-1) Polyoxyethylene lauryl ether (Emulgen 108, Kao Corporation, average number of added moles of oxyethylene groups (n)=6, content of component wherein n=6: 9.2% by mass, and content of component wherein n=7 to 16: 54.7% by mass)
- (a-2) Polyoxyethylene lauryl ether (FUJIFILM Wako Pure Chemical Corporation, average number of added moles of oxyethylene groups (n)=6, content of component wherein n=6: 100% by mass, and content of component wherein n=7 to 16: 0% by mass)
- (a-3) Polyoxyethylene lauryl ether (Emulgen 147, Kao Corporation, average number of added moles of oxyethylene groups (n)=19, content of component wherein n=19: 7.2% by mass, and content of component wherein n=20 to 29: 46.8% by mass)
- (a-4) Polyoxyethylene lauryl ether (Emulgen 102KG, Kao Corporation, average number of added moles of oxyethylene groups (n)=2, content of component wherein n=2: 16.6% by mass, and content of component wherein n=3 to 12: 43.5% by mass)
- (a-5) Polyoxyethylene sorbitan monooleate (RHEODOL TW-O120V, Kao Corporation, average number of added moles of oxyethylene groups (n)=20) (a-6) Sucrose laurate (SURFHOPE SE COSME C-1216, Mitsubishi-Chemical Foods Co., HLB: 16, Mono ester: 80%)

<Oil Agent (b)>
- (b-1) Triolein (Kanto Chemical Co., Inc.)
- (b-2) Tristearin (FUJIFILM Wako Pure Chemical Corporation)
- (b-3) Tripalmitin (FUJIFILM Wako Pure Chemical Corporation)
- (b-4) Trilaurin (Kanto Chemical Co., Inc.)
- (b-5) Squalene (FUJIFILM Wako Pure Chemical Corporation)
- (b-6) Squalane (FUJIFILM Wako Pure Chemical Corporation)
- (b-7) Octane (FUJIFILM Wako Pure Chemical Corporation)
- (b-8) Decane (FUJIFILM Wako Pure Chemical Corporation)
- (b-9) Undecane (FUJIFILM Wako Pure Chemical Corporation)
- (b-11) Dodecane (FUJIFILM Wako Pure Chemical Corporation)
- (b-12) Tridecane (FUJIFILM Wako Pure Chemical Corporation)
- (b-12) Tetradecane (FUJIFILM Wako Pure Chemical Corporation)
- (b-13) Hexadecane (FUJIFILM Wako Pure Chemical Corporation)
- (b-14) Octadecane (FUJIFILM Wako Pure Chemical Corporation)
- (b-15) Isododecane (Marukasol R, Maruzen Petrochemical Co., Ltd.)
- (b-16) Isopropyl myristate (EXCEPARL IPM, Kao Corporation)
- (b-17) Isopropyl palmitate (EXCEPARL IPP, Kao Corporation)
- (b-18) Cetyl 2-ethylhexanoate (EXCEPARL HO, Kao Corporation)
- (b-19) 2-Octyldodecyl myristate (EXCEPARL OD-M, Kao Corporation)
- (b-20) 2-Ethylhexyl stearate (EXCEPARL EH-S, Kao Corporation)
- (b-21) Triglyceride 2-ethylhexanoate (EXCEPARL TGO, Kao Corporation)
- (b-22) Triisodecyl trimellitate (TRIMEX T-10, Kao Corporation)
- (b-23) Diisononyl phthalate (Vinicizer 90, Kao Corporation)
- (b-24) Diisobutyl adipate (Vinicizer 40, Kao Corporation)

<Oil Agent (b') Other than (b)>
- (b'-1) Oleyl alcohol (FUJIFILM Wako Pure Chemical Corporation)
- (b'-2) Oleic acid (FUJIFILM Wako Pure Chemical Corporation)

From Tables 1 to 8, the following can be found.

The liquid-crystal compositions obtained in Examples 1 to 107 (Tables 1, 2, and 5 to 8) are all those containing the Fd-3m liquid crystal. The blending ratio between the surfactant (a) and the water (c) constituting these liquid-crystal compositions is a ratio at which at least one structural body (x) selected from a hexagonal structural body and a pre-hexagonal structural body is formed when mixing the surfactant (a) and the water (c). This is apparent from the fact that the "structural body formed by mixing of the component (a) and the component (c)" contains at least one selected from a hexagonal structural body (H) and a pre-hexagonal structural body (preH). Also, the oil agents (b) selected by the above predetermined method are used in Examples 1 to 107, which results in the liquid-crystal compositions containing the Fd-3m liquid crystals.

In contrast, for the compositions obtained in Comparative Examples 1 to 40 (Tables 3 and 4), the blending ratio between the surfactant (a) and the water (c) constituting those compositions is not a ratio at which the structural body (x) is formed when mixing the surfactant (a) and the water (c). In detail, the "structural body formed by mixing of the component (a) and the component (c)" in Comparative Examples 1 to 40 is only a lamellar structural body (L) or a micelle structural body (m), and neither hexagonal structural body (H) nor pre-hexagonal structural body (preH) is contained. And in these cases, the Fd-3m liquid crystal is not produced, and the liquid-crystal composition of the present invention is not obtained.

Examples 46 to 54 and Comparative Examples 41 to 42 (Table 5) all use polyoxyethylene lauryl ether whose average number of added moles of oxyethylene groups n is 6 as the surfactant (a), and they show examples of different contents of a component having a number of added moles of oxyalkylene groups of n and a component having a number of added moles of oxyalkylene groups of n+1 to n+10 in the polyoxyethylene lauryl ether.

In the surfactant (a) used in Examples 46 and 47, the content of a component having a number of added moles of oxyalkylene groups of 6 (that is, n) is 100% by mass, which means that the surfactant is constituted by a single component. Also, in the surfactant (a) used in Comparative Examples 41 and 42, the content of a component having a number of added moles of oxyalkylene groups of 6 is greater than 80% by mass, which means that the compositional features of the surfactant are close to those of a single component. And in Examples 46 and 47 and Comparative Examples 41 and 42, the "structural body formed by mixing of the component (a) and the component (c)" is only a hexagonal structural body (H).

The hexagonal structural body is a structure that is firmer than the pre-hexagonal structural body, and it is presumed that the hexagonal structural body is less likely to be converted into the Fd-3m liquid crystal even when mixed with the oil agent (b). This is considered to be the reason why the compositional features of Comparative Examples 41 and 42 did not produce the Fd-3m liquid crystal.

However, this result does not indicate that the Fd-3m liquid crystal is not produced when the surfactant (a) is constituted by a single component or has compositional features close to those of a single component. For example, as shown in Examples 46 and 47, by increasing the amount of oil agent (b) blended than in Comparative Examples 41 and 42, the firm hexagonal structural body formed by mixing of the component (a) and the component (c) can be converted into the Fd-3m liquid crystal, thereby obtaining the liquid-crystal composition of the present invention.

Examples 55 to 69 (Table 6) show examples of different average numbers of added moles of oxyethylene groups, n, in polyoxyethylene lauryl ether, which is the component (a). Note that, since the proportion of the component (a-4) blended in Example 68 was small, the entire amount of composition was increased for the sake of convenience in blending.

Examples 70 to 107 (Tables 7 and 8) show examples of different types and amounts of the surfactant (a) and the oil agent (b) to be blended.

Comparative Examples 43 to 46 (Table 8) are compositions in which the surfactant (a) and the water (c) are blended at a ratio where the structural body (x) is formed when mixing them. However, Comparative Examples 43 and 44 show that, when the oil agent (b'), which converts all of the structural body (x) into a lamellar structural body when mixed with the structural body (x), was used instead of the oil agent (b), the Fd-3m liquid crystal was not produced and the liquid-crystal composition of the present invention was not obtained.

As mentioned above, containment of the oil agent (b') other than the oil agent (b) is not excluded in the liquid-crystal composition of the present invention, but the content of oil agent (b') is preferably smaller. Comparative Examples 45 and 46 show that, in a system of polyoxyethylene lauryl ether (a-1), triolein (b-1), and water (c), the Fd-3m liquid crystal is not produced if the content of oleyl alcohol (b'-1), which is the oil agent (b'), is 0.50 and 0.70 as a mass ratio (b')/((b)+(b')). Accordingly, in this system, the mass ratio of the oil agent (b'), (b')/((b)+(b')), is selected in the range of at least less than 0.50 and preferably 0.40 or less.

Figure 2:
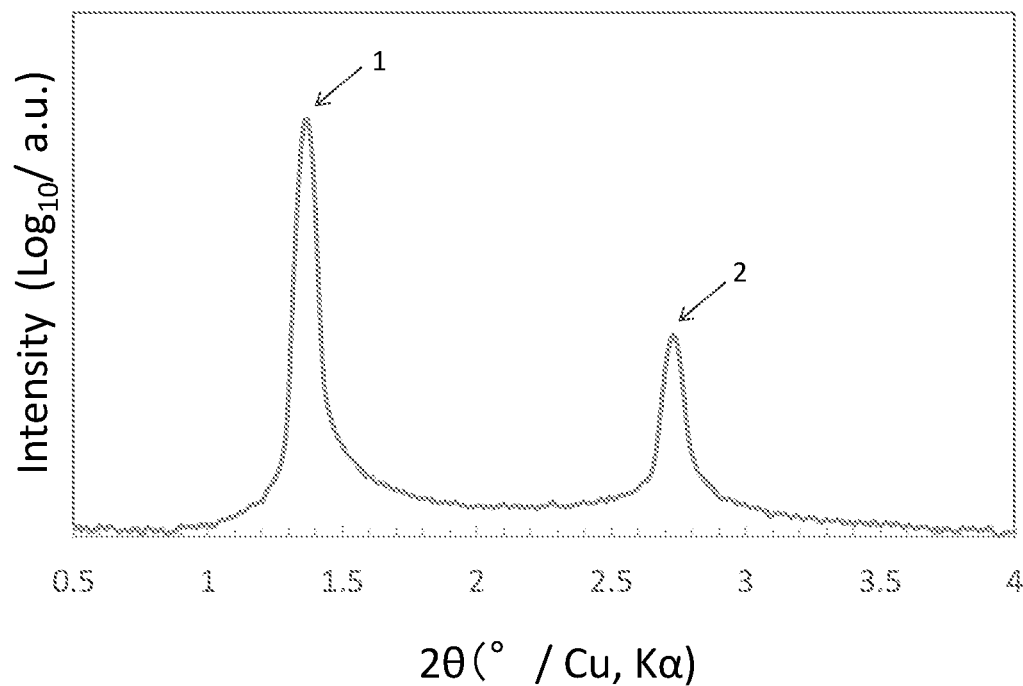
FIG. 2 shows a scattering pattern obtained by analyzing the composition of Comparative Example 45 by small angle X-ray scattering (SAXS).

As an example of SAXS analysis results, FIG. 1 and FIG. 2 show the scattering patterns obtained by SAXS analysis of the compositions of Example 95 and Comparative Example 45, respectively. As shown in FIG. 1, it can be determined that the composition of Example 95 contains liquid crystals having the Fd-3m structure, since the peaks of scattering pattern appear at the positions of $3:\sqrt{8}:\sqrt{11}:\sqrt{12}:\sqrt{16}$. On the other hand, it can be determined that the composition of Comparative Example 45 contains only the lamellar structural body because the peaks of scattering pattern only appear at the positions of 1:2.

Example 108 (Preparation of Liquid-Crystal Composition and Evaluation of Delivery Performance)

Green No. 3 (Kishi Kasei Co., Ltd., hereinafter also referred to as the "component (d-1)"), which is a water-soluble coloring matter, was used as the water-soluble functional component (d), and the delivery performance of the liquid-crystal composition of the present invention was evaluated.

3.33 g of the component (a-1) polyoxyethylene lauryl ether, which is the surfactant (a), and 3.33 g of the component (b-1) triolein, which is the oil agent (b), were heated to 95° C. and mixed uniformly using a vortex mixer. To this, a mixture of 3.33 g of deionized water, which is the component (c), and 0.01 g of a 1 mass % aqueous solution of Green No. 3, which is the component (d-1), was added and uniformly mixed using a vortex mixer, thereby obtaining a liquid-crystal composition A containing the component (d-1).

1 g of the liquid-crystal composition A was added into 10 g of the component (b-1) and dispersed to become uniform using a vortex mixer, thereby obtaining a composition B containing a dispersion of the liquid-crystal composition A. Note that the presence of Fd-3m liquid crystal in the liquid-crystal composition A and in the composition B was confirmed by SAXS analysis.

In a No. 5 Maruemu screw bottle with bore diameter× shell diameter×entire length of φ14.5×φ27×55 mm, 7 g of ion exchanged water as the lower layer (aqueous phase) and 4 g of triolein, which is the component (b-1), as the upper layer (oil phase) were layered, 1 mL of the composition B was added from the upper layer side, and the bottle was left to stand and visually observed. Green coloration was observed in the underlying aqueous phase 2 minutes and 30 seconds after the addition of the composition B, and thus it was confirmed that the liquid-crystal composition A has performance for delivering the component (d-1) beyond the oil phase to the aqueous phase.

Comparative Example 47 (Preparation of Comparative Composition and Evaluation of Delivery Performance)

3.33 g of the component (a-1) polyoxyethylene lauryl ether, which is the surfactant (a), 2.22 g of the component (b-1) triolein, which is the oil agent (b), and 1.11 g of the component (b'-1) oleyl alcohol, which is an oil agent other than the oil agent (b), were heated to 95° C. and mixed uniformly using a vortex mixer. To this, a mixture of 3.33 g of deionized water, which is the component (c), and 0.01 g of a 1 mass % aqueous solution of Green No. 3, which is the component (d-1), was added and uniformly mixed using a vortex mixer, thereby obtaining a comparative composition A' containing the component (d-1). Note that, when carrying out SAXS analysis, only the lamellar structural body existed in the composition A' and the Fd-3m liquid crystal did not exist.

1 g of the comparative composition A' was added into 10 g of the component (b-1) and dispersed to become uniform using a vortex mixer, thereby obtaining a composition B' containing a dispersion of the composition A'.

In a No. 5 Maruemu screw bottle with bore diameter× shell diameter×entire length of $14.5×$27×55 mm, 7 g of ion exchanged water as the lower layer (aqueous phase) and 4 g of triolein, which is the component (b-1), as the upper layer (oil phase) were layered, 1 mL of the composition B' was added from the upper layer side, and the bottle was left to stand and visually observed. Green coloration was not observed in the underlying aqueous phase even after 2 minutes and 30 seconds from the addition of the composition B'.

INDUSTRIAL APPLICABILITY

According to the present invention, a liquid-crystal composition containing a liquid crystal having the Fd-3m structure can be prepared in a wide range of compositional features and by a simple method, without being limited to systems using special blends, thus dramatically increasing the degree of freedom of blending in the preparation of the liquid-crystal composition.

Since the Fd-3m liquid crystal contained in the liquid-crystal composition of the present invention embraces water in a large amount and in the form of fine aggregates of water molecules, the liquid-crystal composition is expected to have delivery performance for transporting a water-soluble component or water dispersible component beyond an oil phase to an aqueous phase, which has not been known conventionally. In addition, since the liquid-crystal composition contains the Fd-3m liquid crystal, which has a liquid crystal structure different from that of conventional lamellar liquid crystal, it provides a different sense of use when applied and spread over a solid surface compared to conventional compositions. For example, when the liquid-crystal composition of the present invention is applied onto the skin, it can provide a feeling of being easily compatible with the skin.

The invention claimed is:

1. A liquid-crystal composition comprising a liquid crystal having an Fd-3m structure, wherein
the liquid-crystal composition is formed by blending a surfactant (a), an oil agent (b), and water (c);
the surfactant (a) is a surfactant that forms at least one structural body (x) selected from a hexagonal structural body and a pre-hexagonal structural body when mixed with the water (c);
the oil agent (b) is an oil agent that does not convert all of the structural body (x) into a lamellar structural body, when the composition is formed by blending; and
a ratio between the surfactant (a) and the water (c) constituting the liquid-crystal composition is a ratio that forms the structural body (x) when mixing the surfactant (a) and the water (c),
wherein the ratio between the surfactant (a) and the water (c) constituting the liquid-crystal composition is 0.1 or more and 0.9 or less, as the mass ratio of the component (a) to the total amount of the component (a) and the component (c), (a)/((a)+(c)),
wherein the liquid-crystal composition contains the oil agent (b) with a content of 0.05 or more and 10 or less, as the mass ratio relative to the surfactant (a), (b)/(a),
wherein the surfactant (a) is a nonionic surfactant,
wherein the nonionic surfactant is a nonionic surfactant represented by the following general formula (a1) or general formula (a2):

   (a1)

wherein $R^{1a}$ is a hydrocarbon group having 7 or more and 18 or less carbon atoms, $R^{2a}$ is an alkylene group having 2 or 3 carbon atoms, and $R^{3a}$ is an alkyl group having 1 or more and 3 or less carbon atoms, or a hydrogen atom; x is an average number of added moles and is a number of 3 or more and 50 or less; and A is —O—, —C(=O)O—, —C(=O)NH—, —C(=O)N=, —NH—, or —N=, and y is 1 when A is —O—, —C(=O)O—, —C(=O)NH—, or —NH— and y is 2 when A is —C(=O)N= or —N=,

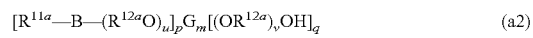   (a2)

wherein $R^{11a}$ represents a hydrocarbon group having 7 or more and 18 or less carbon atoms, and $R^{12a}$ represents an alkylene group having 2 or more and 4 or less carbon atoms; u and v are average numbers of added moles and are each independently a number of 0 or more and 40 or less, and u×p+v×q is 0 or more and 40 or less; G represents a polyhydric alcohol residue having 3 or more and 10 or less carbon atoms and having 3 or more and 10 or less hydroxy groups; m is an average condensation degree of G and is a number of 1 or more and 10 or less; p is 1 or more and is a number equal to or less than the number of hydroxy groups of $G_m$, and q is a number of the number of hydroxy groups of $G_m$-p; and B is —O— or —C(=O)O—,
wherein the oil agent (b) is an oil agent having no hydroxy group, carboxy group, amino group, or amide group,
wherein the oil agent (b) is one or more selected from the group consisting of a hydrocarbon oil having 8 or more and 36 or less carbon atoms, a fatty acid monoester formed of a fatty acid having 8 or more and 22 or less carbon atoms and a monohydric alcohol having 1 or more and 24 or less carbon atoms, a fatty acid diester formed of a fatty acid having 8 or more and 22 or less carbon atoms and a dihydric alcohol having 1 or more and 12 or less carbon atoms, a dicarboxylic acid diester formed of a dicarboxylic acid having 4 or more and 18 or less carbon atoms and a monohydric alcohol having 1 or more and 24 or less carbon atoms, a tricarboxylic acid triester formed of a tricarboxylic acid having 5 or more and 12 or less carbon atoms and a monohydric alcohol having 1 or more and 24 or less carbon atoms, and a glycerin fatty acid triester, wherein the liquid crystal having an Fd-3m structure is a reverse cubic liquid crystal in which the water forms a discontinuous phase.

2. The liquid-crystal composition according to claim 1, wherein, when the nonionic surfactant represented by the above general formula (a1) has an average number of added moles of oxyalkylene groups in the nonionic surfactant of n, and wherein the surfactant component having a number of added moles of oxyalkylene groups of n with a content of 0.1% by mass or more and 80% by mass or less, contains a second component having a number of added moles of oxyalkylene groups of n+1 to n+10 with a content of 0.5% by mass or more and 80% by mass or less, and optionally contains a third component in which n is 0 with a content of 0% by mass or more and 20% by mass or less.

3. The liquid-crystal composition according to claim 1, wherein the oil agent (b) has a melting point of lower than 100° C.

4. The liquid-crystal composition according to claim 1, further comprising a water-soluble or water dispersible functional component (d).

5. The liquid-crystal composition according to claim 4, comprising the functional component (d) in an amount of 0.0001% by mass or more and 40% by mass or less.

6. The liquid-crystal composition according to claim 4, wherein the functional component (d) is one or more selected from the group consisting of a water-soluble coloring matter, a flavor, a disinfectant, a chemical agent, a bleaching agent, an enzyme, and an alkaline agent.

7. The liquid-crystal composition according to claim 1, further comprising an oil soluble functional component (e).

8. The liquid-crystal composition according to claim 7, comprising the functional component (e) in an amount of 0.0001% by mass or more and 40% by mass or less.

9. The liquid-crystal composition according to claim 7, wherein the functional component (e) is one or more selected from the group consisting of a pigment, a moisturizing agent, a lubricating agent, an oil soluble flavor, and a chemical agent.

10. The liquid-crystal composition according to claim 1, further wherein the liquid crystal having an Fd-3m structure is a reverse cubic liquid crystal in which the surfactant forms a continuous phase.

11. A method for producing the liquid-crystal composition according to claim 1, comprising
blending the surfactant (a), the oil agent (b), and the water (c) constituting the liquid-crystal composition so as to satisfy the following conditions 1 to 3:
condition 1: the ratio between the surfactant (a) and the water (c) constituting the liquid-crystal composition is a ratio that forms at least one structural body (x) selected from a hexagonal structural body and a pre-hexagonal structural body when mixing the surfactant (a) and the water (c);
condition 2: the oil agent (b) constituting the liquid-crystal composition is blended in an amount of 5% by mass or more relative to a total amount of the surfactant (a), the oil agent (b), and the water (c); and
condition 3: a temperature at which the components constituting the liquid-crystal composition are mixed is a temperature equal to or higher than a melting point of the oil agent (b).

12. The production method according to claim 11, comprising a step of mixing in advance at least a part of the surfactant (a) with at least a part of the oil agent (b).

13. A method for selecting the surfactant (a) and the oil agent (b) constituting the liquid-crystal composition according to claim 1, comprising the following step 1 to step 3 in order:
step 1: a step of selecting the surfactant (a) that forms at least one structural body (x) selected from a hexagonal structural body and a pre-hexagonal structural body when mixed with the water (c);
step 2: a step of mixing the surfactant (a) and the water (c) at the ratio that forms the structural body (x) to prepare a mixture containing the structural body (x); and
step 3: a step of mixing the mixture obtained in step 2 with an oil agent having the same mass as the surfactant (a) in the mixture to prepare a composition (L), and analyzing a structure of a structural body contained in the composition (L) by small angle X-ray scattering.

* * * * *